United States Patent
Sato et al.

(10) Patent No.: US 8,875,053 B2
(45) Date of Patent: *Oct. 28, 2014

(54) SECURE CONNECTION PROTOCOL FOR IMAGE PROJECTING UNIT, PROCESS AND PROGRAM

(75) Inventors: Minoru Sato, Sapporo (JP); Shinji Kubota, Ina (JP)

(73) Assignee: Seiko Epson Corporation, Tokyo (JP)

( * ) Notice: Subject to any disclaimer, the term of this patent is extended or adjusted under 35 U.S.C. 154(b) by 637 days.

This patent is subject to a terminal disclaimer.

(21) Appl. No.: 12/628,654

(22) Filed: Dec. 1, 2009

(65) Prior Publication Data

US 2010/0100847 A1 Apr. 22, 2010

Related U.S. Application Data

(63) Continuation of application No. 11/902,616, filed on Sep. 24, 2007, now Pat. No. 7,735,130, and a continuation of application No. 10/442,056, filed on May 21, 2003, now Pat. No. 7,293,071.

(30) Foreign Application Priority Data

May 27, 2002 (JP) ................................ 2002-152413

(51) Int. Cl.
*G06F 3/048* (2013.01)
(52) U.S. Cl.
USPC ......................................................... 715/810
(58) Field of Classification Search
CPC .................................................. H04L 61/2015
USPC ......................................................... 715/810
See application file for complete search history.

(56) References Cited

U.S. PATENT DOCUMENTS

| 4,430,526 A | 2/1984 | Brown et al. |
| 4,599,489 A | 7/1986 | Cargile |
| 4,800,590 A | 1/1989 | Vaughan |

(Continued)

FOREIGN PATENT DOCUMENTS

| EP | 0 656 581 A1 | 10/1994 |
| EP | 0 737 911 A1 | 10/1996 |

(Continued)

OTHER PUBLICATIONS

Jan. 25, 2006 Office Action issued in U.S. Appl. No. 10/228,334.

(Continued)

*Primary Examiner* — William Bashore
*Assistant Examiner* — Henry Orr
(74) *Attorney, Agent, or Firm* — Oliff PLC

(57) ABSTRACT

There has been a problem of necessitating a complicated work for establishing a connection capable of intercommunication between a computer as server and a projector as client.

When a connection is established between a server 20 and projectors 301 through 30n, a communication command is issued according to UDP-based broadcasting to retrieve connectable projectors 301 through 303. Thereafter, the projector 301 to be connected is selected and is assigned an IP address to establish the connection. In this manner, a user can easily obtain a connection environment capable of intercommunication between the server 20 and the projector 301. A TCP/IP communication command is used to input or output image data, ensuring reliable transmission. Since the authentication can be provided using a keyword projected during the connection establishment, it is possible to prevent an unauthorized access to the projector 301 by an outsider.

6 Claims, 24 Drawing Sheets

(56) References Cited

U.S. PATENT DOCUMENTS

| | | | |
|---|---|---|---|
| 5,572,193 | A | 11/1996 | Flanders et al. |
| 5,758,079 | A | 5/1998 | Ludwig et al. |
| 5,768,510 | A | 6/1998 | Gish |
| 5,771,352 | A | 6/1998 | Nakamura et al. |
| 5,877,747 | A | 3/1999 | Kitao et al. |
| 6,141,000 | A | 10/2000 | Martin |
| 6,148,406 | A | 11/2000 | Weisz et al. |
| 6,169,976 | B1 | 1/2001 | Colosso |
| 6,198,542 | B1 | 3/2001 | Tabata |
| 6,345,294 | B1 | 2/2002 | O'Toole et al. |
| 6,417,933 | B1 | 7/2002 | Szurkowski |
| 6,493,467 | B1 | 12/2002 | Okuda et al. |
| 6,642,918 | B2 | 11/2003 | Uchida et al. |
| 6,670,603 | B2 | 12/2003 | Shimada et al. |
| 6,735,616 | B1 | 5/2004 | Thompson et al. |
| 6,760,749 | B1 | 7/2004 | Dunlap et al. |
| 6,783,252 | B1 | 8/2004 | Cambron |
| 6,828,986 | B2 | 12/2004 | Sakashita et al. |
| 6,830,340 | B2 | 12/2004 | Olson et al. |
| 6,904,451 | B1 | 6/2005 | Orfitelli et al. |
| 6,904,526 | B1 | 6/2005 | Hongwei |
| 6,928,166 | B2 | 8/2005 | Yoshizawa |
| 6,957,232 | B2 | 10/2005 | Hoeye et al. |
| 7,016,058 | B1 | 3/2006 | Tabata |
| 7,016,935 | B2 | 3/2006 | Lee et al. |
| 7,018,043 | B2 | 3/2006 | Castaldi et al. |
| 7,047,088 | B2 | 5/2006 | Nakamura et al. |
| 7,139,248 | B2 | 11/2006 | Murai et al. |
| 7,191,214 | B2 | 3/2007 | Watanabe |
| 7,254,418 | B2 | 8/2007 | Iwasaki |
| 7,293,071 | B2 | 11/2007 | Sato et al. |
| 7,397,476 | B2 | 7/2008 | Akaiwa et al. |
| 7,403,510 | B1 | 7/2008 | Miyake |
| 7,447,906 | B2 * | 11/2008 | Kubota ............... 713/168 |
| 7,486,254 | B2 | 2/2009 | Suzuki et al. |
| 7,647,555 | B1 | 1/2010 | Wilcox et al. |
| 7,770,210 | B2 | 8/2010 | Kubota |
| 7,782,330 | B2 | 8/2010 | Akaiwa et al. |
| 7,797,430 | B2 | 9/2010 | Ichieda |
| 7,965,284 | B2 | 6/2011 | Akaiwa et al. |
| 2001/0003479 | A1 | 6/2001 | Fujiwara |
| 2001/0017630 | A1 | 8/2001 | Sakashita et al. |
| 2001/0017712 | A1 | 8/2001 | Kasatani |
| 2001/0021980 | A1 | 9/2001 | Linden et al. |
| 2001/0037366 | A1 | 11/2001 | Webb et al. |
| 2002/0015175 | A1 | 2/2002 | Katsuda |
| 2002/0026512 | A1 | 2/2002 | Nishimura et al. |
| 2002/0036652 | A1 | 3/2002 | Masumoto et al. |
| 2002/0083319 | A1 | 6/2002 | Ishiguro et al. |
| 2002/0090912 | A1 | 7/2002 | Cannon et al. |
| 2002/0106086 | A1 | 8/2002 | Kamiya et al. |
| 2002/0108108 | A1 * | 8/2002 | Akaiwa et al. ............... 725/30 |
| 2002/0122075 | A1 * | 9/2002 | Karasawa et al. ............ 345/846 |
| 2002/0131078 | A1 | 9/2002 | Tsukinokizawa |
| 2002/0133713 | A1 | 9/2002 | Fieschi et al. |
| 2002/0154210 | A1 | 10/2002 | Ludwig et al. |
| 2002/0175915 | A1 | 11/2002 | Lichtfuss |
| 2002/0196378 | A1 | 12/2002 | Slobodin et al. |
| 2003/0017846 | A1 | 1/2003 | Estevez et al. |
| 2003/0028637 | A1 | 2/2003 | Gross |
| 2003/0034999 | A1 | 2/2003 | Coughlin, III et al. |
| 2003/0048281 | A1 | 3/2003 | Murai et al. |
| 2003/0051139 | A1 | 3/2003 | Kubota |
| 2003/0072429 | A1 | 4/2003 | Slobodin et al. |
| 2003/0081561 | A1 | 5/2003 | Hsiao |
| 2003/0088793 | A1 | 5/2003 | Parry |
| 2003/0110217 | A1 * | 6/2003 | Raju ............... 709/204 |
| 2003/0115263 | A1 | 6/2003 | Tran et al. |
| 2003/0191738 | A1 | 10/2003 | Hoeye et al. |
| 2003/0198347 | A1 | 10/2003 | Ribes et al. |
| 2003/0202661 | A1 | 10/2003 | Rodriguez et al. |
| 2003/0202679 | A1 | 10/2003 | Rodriguez |
| 2003/0204716 | A1 | 10/2003 | Rockwood et al. |
| 2003/0217293 | A1 * | 11/2003 | Lee ............... 713/202 |
| 2003/0221011 | A1 * | 11/2003 | Shitano ............... 709/229 |
| 2003/0225641 | A1 | 12/2003 | Gritzmacher et al. |
| 2003/0236895 | A1 | 12/2003 | Ohkubo et al. |
| 2004/0051734 | A1 | 3/2004 | Taniguchi et al. |
| 2004/0073795 | A1 | 4/2004 | Jablon |
| 2004/0109137 | A1 | 6/2004 | Bubie et al. |
| 2004/0117445 | A9 | 6/2004 | Lee et al. |
| 2004/0119945 | A1 * | 6/2004 | Nakamura et al. ............... 353/30 |
| 2004/0123118 | A1 | 6/2004 | Dahan et al. |
| 2004/0130502 | A1 | 7/2004 | Sato et al. |
| 2004/0130568 | A1 | 7/2004 | Nagano et al. |
| 2004/0161277 | A1 | 8/2004 | Gassho et al. |
| 2004/0227900 | A1 | 11/2004 | Sato et al. |
| 2004/0236943 | A1 | 11/2004 | Edwards et al. |
| 2004/0249945 | A1 | 12/2004 | Tabuchi et al. |
| 2005/0012911 | A1 | 1/2005 | Cambron |
| 2005/0033805 | A1 | 2/2005 | Fujiyama et al. |
| 2005/0036509 | A1 | 2/2005 | Acharya et al. |
| 2005/0043973 | A1 | 2/2005 | Childers |
| 2005/0066047 | A1 | 3/2005 | Miyake et al. |
| 2005/0068506 | A1 | 3/2005 | Moriwaki et al. |
| 2005/0071430 | A1 | 3/2005 | Kobayashi et al. |
| 2005/0091359 | A1 | 4/2005 | Soin et al. |
| 2005/0097179 | A1 | 5/2005 | Orme |
| 2005/0102356 | A1 | 5/2005 | Manion et al. |
| 2005/0134523 | A1 | 6/2005 | Challener et al. |
| 2005/0163549 | A1 | 7/2005 | Shima et al. |
| 2005/0210390 | A1 | 9/2005 | Ono |
| 2005/0262223 | A1 | 11/2005 | Kimura |
| 2006/0170875 | A1 | 8/2006 | Falck et al. |
| 2006/0184497 | A1 | 8/2006 | Suzuki et al. |
| 2006/0250585 | A1 | 11/2006 | Anderson et al. |
| 2007/0005809 | A1 | 1/2007 | Kobayashi et al. |
| 2007/0286144 | A1 | 12/2007 | Miyake |
| 2008/0234843 | A1 | 9/2008 | Akaiwa et al. |
| 2010/0257586 | A1 | 10/2010 | Kubota |
| 2011/0210977 | A1 | 9/2011 | Akaiwa et al. |

FOREIGN PATENT DOCUMENTS

| | | | |
|---|---|---|---|
| EP | 0 874 300 A2 | 10/1998 | |
| EP | 1 059 766 A2 | 12/2000 | |
| JP | A-06-197340 | 7/1994 | |
| JP | A-07-200215 | 8/1995 | |
| JP | A-07-336370 | 12/1995 | |
| JP | A-09-503877 | 4/1997 | |
| JP | A-09-198206 | 7/1997 | |
| JP | A-09-205643 | 8/1997 | |
| JP | A-10-200638 | 7/1998 | |
| JP | A-10-289106 | 10/1998 | |
| JP | A-11-098170 | 4/1999 | |
| JP | A-11-319815 | 11/1999 | |
| JP | B2-3017925 | 12/1999 | |
| JP | A-2000-076028 | 3/2000 | |
| JP | A-2000-089726 | 3/2000 | |
| JP | 2000-122944 A | 4/2000 | |
| JP | A-2000-122829 | 4/2000 | |
| JP | A-2000-122944 | 4/2000 | |
| JP | A-2000-165577 | 6/2000 | |
| JP | 2000-222163 A | 8/2000 | |
| JP | A-2000-222163 | 8/2000 | |
| JP | A-2001-016664 | 1/2001 | |
| JP | A-2001-092408 | 4/2001 | |
| JP | A-2001-103078 | 4/2001 | |
| JP | A-2001-144767 | 5/2001 | |
| JP | 2001175602 A * | 6/2001 | ............... G06F 15/00 |
| JP | A-2001-175602 | 6/2001 | |
| JP | A-2001-202316 | 7/2001 | |
| JP | A-2001-273259 | 10/2001 | |
| JP | A-2001-312472 | 11/2001 | |
| JP | A-2001-343959 | 12/2001 | |
| JP | A-2001-358919 | 12/2001 | |
| JP | A-2002-7091 | 1/2002 | |
| JP | A-2002-007350 | 1/2002 | |
| JP | 2002057964 A * | 2/2002 | ............... H04N 5/74 |
| JP | A-2002-044096 | 2/2002 | |
| JP | A-2002-099473 | 4/2002 | |
| JP | A-2003-006128 | 1/2003 | |
| JP | A-2003-110555 | 4/2003 | |
| JP | A-2003-173117 | 6/2003 | |

(56) References Cited

FOREIGN PATENT DOCUMENTS

| JP | A-2003-173177 | 6/2003 |
|---|---|---|
| JP | A-2003-069923 | 7/2003 |
| JP | A-2003-256063 | 9/2003 |
| JP | A-2003-333559 | 11/2003 |
| JP | A-2004-062477 | 2/2004 |
| JP | A-2005-084846 | 3/2005 |
| JP | A-2005-099574 | 4/2005 |
| JP | B2-4022683 | 10/2007 |
| WO | WO 95/10823 A1 | 4/1995 |
| WO | WO 99/37055 A1 | 7/1999 |
| WO | WO 01/92953 A1 | 12/2001 |

OTHER PUBLICATIONS

Jul. 11, 2006 Office Action issued in U.S. Appl. No. 10/228,334.
Nov. 9, 2006 Office Action issued in U.S. Appl. No. 10/228,334.
May 2, 2007 Office Action issued in U.S. Appl. No. 10/228,334.
Jul. 18, 2007 Advisory Action issued in U.S. Appl. No. 10/228,334.
Dec. 27, 2007 Office Action issued in U.S. Appl. No. 10/228,334.
Apr. 8, 2008 Interview Summary issued in U.S. Appl. No. 10/228,334.
Aug. 5, 2008 Notice of Allowance issued in U.S. Appl. No. 10/228,334.
Jul. 6, 2007 Office Action issued in Japanese Patent Application No. 11-360141 (translation only).
Richardson et al., "Virtual Network Computing," IEEE Internet Computing, vol. 2, No. 1, Jan./Feb. 1998, pp. 33-38.
Aug. 31, 2011 Office Action issued in U.S. Appl. No. 12/493,809.
European Search Report issued in EP Application No. 10177911.4 on Dec. 6, 2010.
European Search Report issued in EP Application No. 10177908.0 on Dec. 3, 2010.
European Search Report issued in EP Application No. 10177910.6 on Dec. 3, 2010.
Office Action dated Jul. 12, 2013 issued in U.S. Appl. No. 12/942,838.
Berger et al., "Using Symbiotic Displays to View Sensitive Information in Public," Mar. 2005, Third IEEE International Conference on Pervasive Computing and Communications, pp. 139-148.
Bloom, Jeffrey A., "Security and Rights Management in Digital Cinema," Jul. 2003, Proceedings of International Conference on Multimedia and Expo, vol. 1, pp. 621-624.
Dec. 6, 2011 Office Action issued in Japanese Application No. 2009-216796 (with translation).
Apr. 16, 2012 Office Action issued in U.S. Appl. No. 12/942,838.
Apr. 26, 2013 Office Action issued in U.S. Appl. No. 13/531,868.
Apr. 8, 2008 Office Action issued in U.S. Appl. No. 10/228,334.
Aug. 9, 2010 Office Action issued in U.S. Appl. No. 11/032,134.
Jan. 19, 2012 Office Action issued in U.S. Appl. No. 11/694,363.
Jul. 27, 2009 Office Action issued in U.S. Appl. No. 11/032,134.
Mar. 16, 2009 Office Action issued in U.S. Appl. No. 11/032,134.
Mar. 3, 2010 Office Action issued in U.S. Appl. No. 11/032,134.
May 11, 2011 Office Action issued in U.S. Appl. No. 12/942,838.
May 26, 2010 Notice of Allowance issued in U.S. Appl. No. 11/905,084.
Oct. 16, 2009 Office Action issued in U.S. Appl. No. 11/905,084.
Oct. 19, 2011 Notice of Allowance issued in U.S. Appl. No. 12/942,838.
Sep. 2, 2008 Office Action issued in U.S. Appl. No. 11/032,134.
May 23, 2013 Office Action issued in U.S. Appl. No. 13/587,555.
U.S. Appl. No. 12/942,838 in the name of Kubota, filed on Nov. 19, 2010.
U.S. Appl. No. 13/531,868 in the name of Kubota, filed on Jun. 25, 2012.
U.S. Appl. No. 13/618,130 in the name of Fujimori, filed on Sep. 14, 2012.
U.S. Appl. No. 13/531,048 in the name of Sato et al., filed on Jun. 22, 2012.
U.S. Appl. No. 13/587,555 in the name of Kubota, filed on Aug. 16, 2012.
Nov. 8, 2013 Office Action issued in U.S. Appl. No. 13/531,048.
Nov. 14, 2013 Office Action issued in U.S. Appl. No. 13/587,555.
U.S. Appl. No. 14/084,014 in the names of Kubota, filed on Nov. 19, 2013.
Nov. 29, 2013 Office Action issued in U.S. Appl. No. 13/618,130.
May 19, 2014 Office Action issued in U.S. Appl. No. 13/618,130.
Mar. 26, 2014 Notice of Allowance issued in U.S. Appl. No. 13/531,048.
Apr. 8, 2014 Notice of Allowance issued in U.S. Appl. No. 13/587,555.

* cited by examiner

SECURE CONNECTION PROTOCOL FOR IMAGE PROJECTING UNIT, PROCESS AND PROGRAM

This is a Continuation of application Ser. No. 11/902,616 filed Sep. 24, 2007, which in turn is a Continuation of application Ser. No. 10/442,056 filed May 21, 2003. This application claims the benefit of Japanese Patent Application No. 2002-152413 filed May 27, 2002. The disclosure of the prior applications are hereby incorporated by reference herein in its entirety.

BACKGROUND OF THE INVENTION

1. Field of the Invention

The present invention relates to an image data transmission system, an image data transmission method, an image data transmission program, an image data output device, and an image display device appropriately used for allowing a client to display images based on image data output from a server via a network.

2. Description of the Prior Art

Conventionally, there is provided a projector system using this type of image data transmission system. The projector system comprises a client, e.g., a projector installed in a meeting room, and servers, e.g., computers that output image data to the client. The client projector projects an image that is displayed on a display of the server computer in the meeting room. When the client projector projects an image displayed on the server display, it is necessary to first establish a connection capable of intercommunication between the client projector and the server.

In many cases, the TCP/IP communication protocol is used to establish this connection. At this time, a server user confirms an IP address of the client projector and assigns the IP address to the server. In addition, the user assigns a server's IP address to the client projector. Through this process of setting the IP addresses for the server and the client, the client projector and the server can communicate with each other based on the TCP/IP communication protocol. In this manner, the server outputs image data to the client projector. The client projector receives this image data and projects an image based on the image data.

The above-mentioned conventional projector system has been subject to the problem of a complicated process of making a connection capable of intercommunication between the server computer and the client projector.

SUMMARY OF THE INVENTION

The present invention has been made in consideration of the foregoing. It is therefore an object of the present invention to provide an image data transmission system, an image data transmission method, an image data transmission program, an image data output device, and an image display device capable of establishing a connection compliant with intercommunication between a server and a client through the use of a simple technique.

In order to achieve the above-mentioned object, the present invention provides an image data transmission system which connects a server with a plurality of clients on an intercommunicable network and allows the server to output and display image data on the clients. First, the server outputs a retrieval command to request a response including connectability to any of the clients on the network.

When the connection is available, each client uses a retrieval response unit to output a response including connectability to the retrieval command. The server's client retrieval unit can retrieve connectable clients based on a response to the retrieval command.

When connectable clients are retrieved, the server uses a client connection establishment unit to output a connection command to a specific client intended for connection to request a response including information needed for the connection. When the connection command is input, the client uses a server connection establishment unit to output a response including information needed for the connection to a client connection unit in response to the connection command. When the client connection establishment unit inputs a response to the connection command output by the server connection establishment unit, the server establishes a connection with the specific client based on the connection-related information included in the response. The client also establishes the connection to the server in correspondence with that information. The server uses an image data output unit to output image data to the connected client. The client uses an image data input unit to input this image data and uses an image display unit to display an image based on the image data.

As mentioned above, the present invention can provide an image data transmission system, an image data transmission method, and an image data transmission program capable of establishing a connection compliant with intercommunication between a server and a client through the use of a simple technique.

When the keyword-based authentication is used for connection between the server and the client, it is possible to protect the client against an unauthorized access by a person who does not know the keyword.

According to another embodiment of the present invention, the client's server connection establishment unit has a keyword determination unit for determining a match between the keyword contained in the connection command for transmission and a keyword specified by the client. When the client connection establishment unit outputs the connection command, the connection command includes a specific keyword specified by the client as an output target. When the client receives the connection command including the keyword, the keyword determination unit determines whether or not the keyword matches. When a match is found, the client outputs a response to the client connection establishment unit to establish a connection to the server. The server also establishes a connection to the client based on the response to the connection command including the keyword.

In this manner, the keyword-based authentication can prevent an unauthorized access.

There is no specific limitation on forms of a network that connects the server and the client in an intercommunicable manner. On the other hand, when image data is output, the present invention employs a technique of retrieving connectable clients and establishing a connection. In consideration for this embodiment, it may be preferable to configure a wireless network of connecting the server and the client in an intercommunicable manner as an example of preferred network forms.

Obviously, the present invention is not limited to the wireless network of connecting the server and the client in an intercommunicable manner. The present invention can be also embodied as a wired network of connecting the server and the client in an intercommunicable manner.

In this manner, an example of preferred network forms can be provided by applying the image data transmission system according to the present invention.

When a plurality of connectable clients is retrieved, it is preferable to be able to select intended clients. According to another embodiment of the present invention, the client retrieval unit is provided with a list screen display unit for displaying a list screen of clients determined to be connectable and a client selection unit for selecting intended clients. In this case, a client user visually checks the retrieval result on the list screen displayed by the list screen display unit and uses the client selection unit to select an intended client to be connected.

In this manner, the user can select intended clients from the connectable clients.

From a security viewpoint, it is preferable to be able to change the keyword each time a connection is made. Still another embodiment of the present invention provides the client with a keyword specification unit which then generates a keyword based on random numbers. When establishing a connection with the client, the server uses a keyword output unit to output the keyword generated by the keyword specification unit.

In this manner, it is possible to improve the keyword security.

There is a plurality of clients. When the server retrieves connectable clients from these clients, many clients to be retrieved increase a process time spent for the retrieval. As an example of preferred communication protocols to shorten the process time for the retrieval, it may be preferable to use the broadcasting based on the UDP communication protocol for implementing intercommunication between the client retrieval unit and the retrieval response output unit. That is to say, the server's client retrieval unit outputs the retrieval command to unspecified clients based on the UDP. The client's retrieval response output unit outputs a response to the retrieval command based on the UDP without specifying destinations.

In this manner, it is possible to fast retrieve connectable clients.

After the connection is established, it is necessary to improve the reliability of exchanging image data and the like between the server and the client. When establishing a connection between the client connection establishment unit and the server connection establishment unit, it may be preferable to connect the client and the server based on the TCP/IP communication protocol.

When the TCP/IP communication protocol is used for connection, an IP address needs to be assigned to the client. When the client's server connection establishment unit establishes a connection to the server based on the TCP/IP, the same server connection establishment unit may retrieve and assign available IP addresses as an example technique of assigning the IP address.

Of course, the server may specify a given IP address and assign it to the client. When the server's client connection establishment unit establishes a connection to the client based on the TCP/IP, yet another embodiment of the present invention uses an IP address notification unit to notify an available IP address to the client's server connection establishment unit for assignment.

If a user can select whether the client or the server should assign an IP address to the client, a method appropriate for situations can be conveniently selected.

Still yet another embodiment of the present invention provides the server with an IP address setting selection screen display unit. Based on an IP address setting selection screen displayed by the IP address setting selection screen display unit, a user is allowed to select whether a client's IP address setting unit or the server's IP address notification unit should assign an IP address to the server connection establishment unit. A selection result acquisition unit obtains the selection result.

In this manner, it is possible to select whether the client or the server should assign an IP address to the client.

The server may output image data specified by a file name to the client. It may be also preferable to output image data based on an image displayed on the server. The latter technique is convenient because an image visualized on the server can be also displayed on the client. The server's image data output unit may output image data forming an image displayed on the server's image display unit to the client.

A network load increases if image data forming the same image is output each time image data needs to be output. According to yet still another embodiment of the present invention, an image state determination unit periodically determines a degree of state changes in an image displayed on the server's image display unit. When the image state determination unit determines a change in an image state, the image data output unit outputs the image data to the client.

In this manner, a network load can be decreased when image data is output. In addition, it is possible to decrease loads for processing image data on the server and the client.

When an image changes, it may change entirely or partially. When the image changes partially, it is unnecessary to output image data constituting the entire image. When the image data output unit outputs image data, it may be preferable to obtain image data corresponding to a changed part in the image and output the obtained image data to the client.

In this manner, a network load can be further decreased when image data is output. In addition, it is possible to decrease more loads for processing image data on the server and the client.

There is provided an example of techniques that can improve the security of image data to be output from the server to the client. The server's image data output unit may be provided with an image data encryption unit capable of encrypting image data. The client's image data input unit may be provided with an image data decryption unit for decrypting encrypted image data.

While encrypting image data improves the security, there are required encryption and decryption processes, slowing down a process speed. Depending on situations, it is necessary to fast output image data and display an image. Therefore, it is preferable if there is a capability of selecting whether or not to enable the encryption according to the user's convenience.

According to still yet another embodiment of the present invention, the image data encryption unit has an encryption selection screen display unit for displaying a selection screen capable of selecting whether or not to encrypt the image data to be output. When the encryption selection screen display unit selects execution of the encryption, the image data encryption unit encrypts the image data.

There is provided an example of techniques that can allow a user to recognize the above-mentioned keyword specified by the client. That is to say, it may be preferable to use a visually recognizable image to display the keyword specified by the keyword specification unit of the client's image display unit. This makes it possible to visually recognize the keyword.

The client just needs to be able to display an image based on image data output from the server. There are no other limitations. That is to say, it may be preferable to configure the client using a computer and display image data output from the server as an image on a client's display. Here, a projector may be used for at least one of clients as a preferred example of displaying images based on image data output from the server. In this case, the image display unit comprises an image projection unit. The projector projects an image based on the image data.

Here, the above-mentioned image data transmission system is provided as a concrete configuration comprising the server and the client. Obviously, on the other hand, such image data transmission system also functions through a method with which the server and the client chronologically perform specified processes. Accordingly, the present invention is also available as an image data transmission method comprising the server and the client. Such image data transmission system may be provided independently or may be built in a device. The concept of the invention is not limited thereto but may be otherwise variously embodied. Accordingly, the present invention can be appropriately changed to be software or hardware. When the concept of the invention is embodied as software of the image data transmission system, there is clearly provided a program to implement such functions. Executing the program makes the functions available. Therefore, the present invention is also available as an image data transmission program that can be executed in the server and the client to implement the above-mentioned functions.

It is to be distinctly understood that the present invention is applicable to an independent device having the above-mentioned server functions. The present invention is also available as an image data output device to be able to connect with a plurality of clients via a network capable of intercommunication and to output displayable image data to the clients. The image data output device comprises: a client retrieval unit for outputting a retrieval command to request a response including connectability to any of the clients on the network and for retrieving connectable clients based on a response to the retrieval command; a client connection establishment unit for outputting a connection command to a specific client intended for connection out of the retrieved connectable clients to request a response including information needed for connection and for establishing connection with the specific client based on information needed for connection and included in the response; and an image data output unit for outputting image data to the connected client.

In this manner, it is possible to provide the image data output device capable of establishing a connection compliant with intercommunication with the client through the use of a simple technique.

Likewise, it is to be distinctly understood that the present invention is also applicable to an independent device having the above-mentioned client functions. The present invention is also available as an image display device to be able to connect with a server via a network capable of intercommunication and provides display based on image data output from the server. The image display device comprises: a retrieval response output unit for, when the connection is available, outputting a response including connectability to a retrieval command which is output from the server to unspecified clients and requests a response including connectability; a server connection establishment unit for, when a connection command output from the server is input, outputting a response including information needed for connection to the connection command and establishing connection with the server corresponding to the information; an image data input unit for inputting image data output from the connected server; and an image display unit for displaying an image based on image data input from the image data input unit.

In this manner, it is possible to provide the image display device capable of establishing a connection compliant with intercommunication with the server through the use of a simple technique.

DETAILED DESCRIPTION OF THE PREFERRED EMBODIMENTS

Embodiments of the present invention will be described in further detail with reference to the accompanying drawings in the following order.

Figure 1:
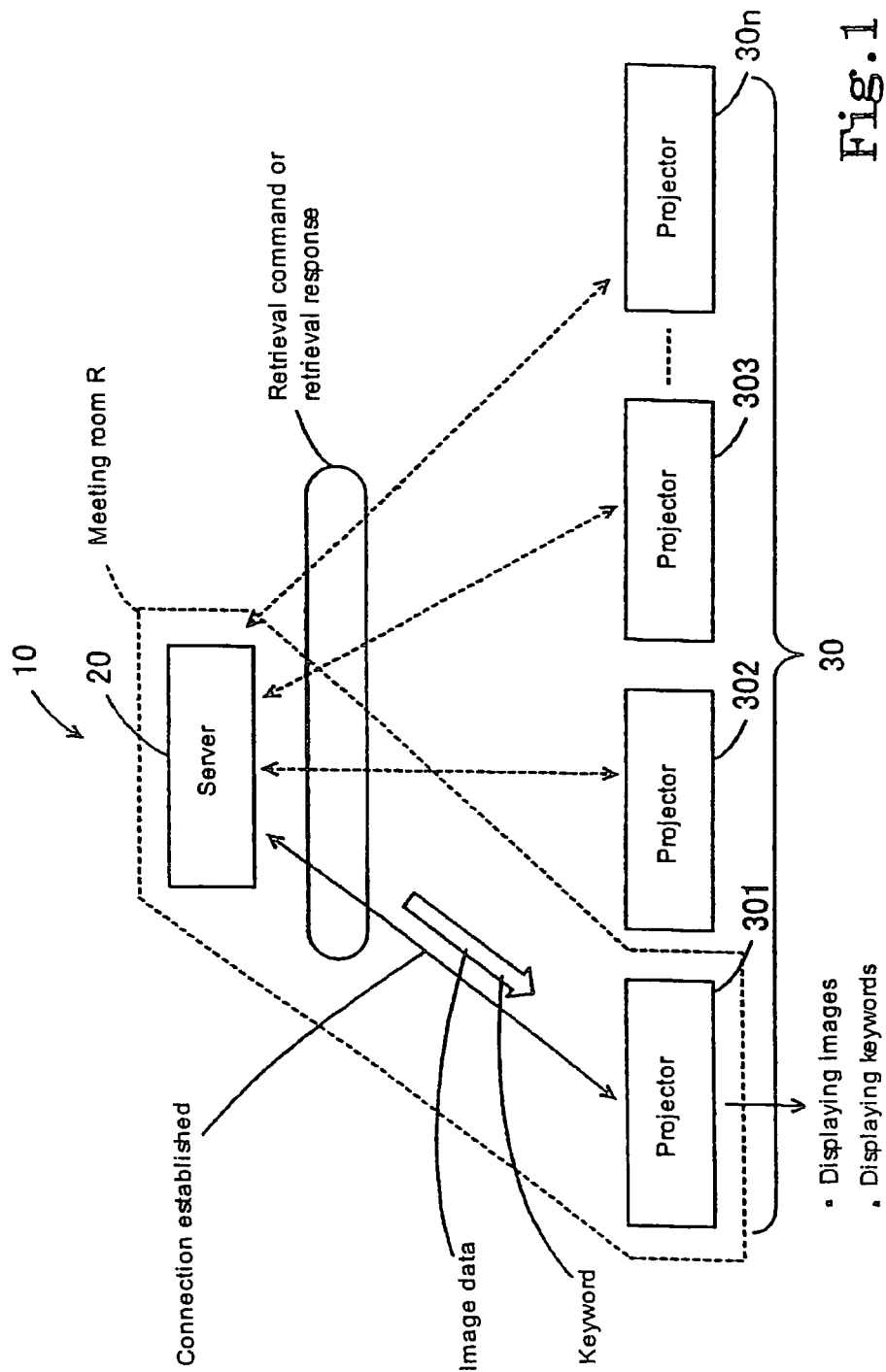
FIG. 1 shows a configuration of a projector system compliant with the image data transmission system according to the present invention.

(1) Configuration of the projector system
(2) Configuration of the server
(3) Configuration of the projector
(4) Contents of the server process
(5) Contents of the projector process
(6) Modifications
(7) Summary (1) Configuration of the Projector System FIG. 1 shows a configuration of a projector system compliant with the image data transmission system according to the present invention. In FIG. 1, a projector system 10 comprises a server 20 and a projector 30 as a client. Image data is output from the server 20 and is input to the projector 30. The projector 30 projects an image based on this image data. According to the embodiment, the projector 30 comprises a plurality of projectors 301 through 30$n$. The server 20 specifies any of the projectors 30 that are connectable and are intended to output image data and project images. The server then makes network connection with the specified projector 30 so as to be capable of intercommunication.

In this case, the server 20 retrieves the projectors 301 through 30$n$ that are connectable. At this time, the server 20 broadcasts a retrieval command to the projectors 301 through 30$n$. When any of the projectors 301 through 30$n$ responded to the retrieval command, the server 20 assumes these projectors to be connectable. The server 20 selects the intended projectors 301 through 30$n$ from the connectable projectors 301 through 30$n$. The server 20 establishes connection with the selected projectors 301 through 30$n$ to perform intercommunication. As will be discussed in more detail below, the embodiment speeds up the retrieval by using the UDP communication protocol to perform communication of issuing the retrieval command and responding to this command. The following presents an example to explain the connection. Let us assume that the projector 301 is placed in a meeting room R. A user brings the server 20 in the meeting room R. When the server 20 issues the retrieval command, the projector 301 should return a retrieval response. The server 20 establishes connection with the projector 301 that responded to the retrieval command.

The embodiment uses the TCP/IP communication protocol for the connection to be described later. This makes it possible to improve the reliability of the communication thereafter. When the TCP/IP protocol is used for the connection, the projectors 301 through 30$n$ are automatically assigned IP addresses. This makes it possible to automatically perform a sequence of processes from retrieving the connectable projectors 301 through 30$n$ to making a connection based on TCP/IP. Further, it becomes possible to easily establish a connection capable of intercommunication between the server 20 and the projectors 301 through 30$n$. This automatic IP address setting is performed when a network's environment is configured with a DHCP server, IP fixing, and the like, and a server to be connected to such network is incompliant with the environment. According to the embodiment, as will be discussed in more detail below, keywords are assigned to the projectors 301 through 30$n$ for the server 20 to authenticate a connection to the projectors 301 through 30$n$. The keyword may be visually displayed on the projector 301 or may be displayed as a projected image. It may be preferable to preassign one keyword to each of the projectors 301 through 30$n$. Alternatively, it may be preferable to allow the projectors 301 through 30$n$ to generate keywords based on random numbers as needed and project the generated keywords.

When establishing a connection, the server 20 outputs the keyword to a projector to be connected, e.g., the projector 301 which then authenticates the keyword. Since keywords are generated based on random numbers, projected, and authenticated, it becomes possible to prevent a person (an outsider) not present in the meeting room R from accessing the projector 301 for outputting image data. As mentioned above, the embodiment automates a sequence of processes from retrieving the connectable projectors 301 through 30$n$ to establishing a connection capable of intercommunication. Consequently, a user of the projector 301 just needs to bring the server 20 into the meeting room R and perform the above-mentioned processes in order to be able to allow the projector 301 to output image data and to project images based on the image data.

(2) Configuration of the Server

Figure 2:
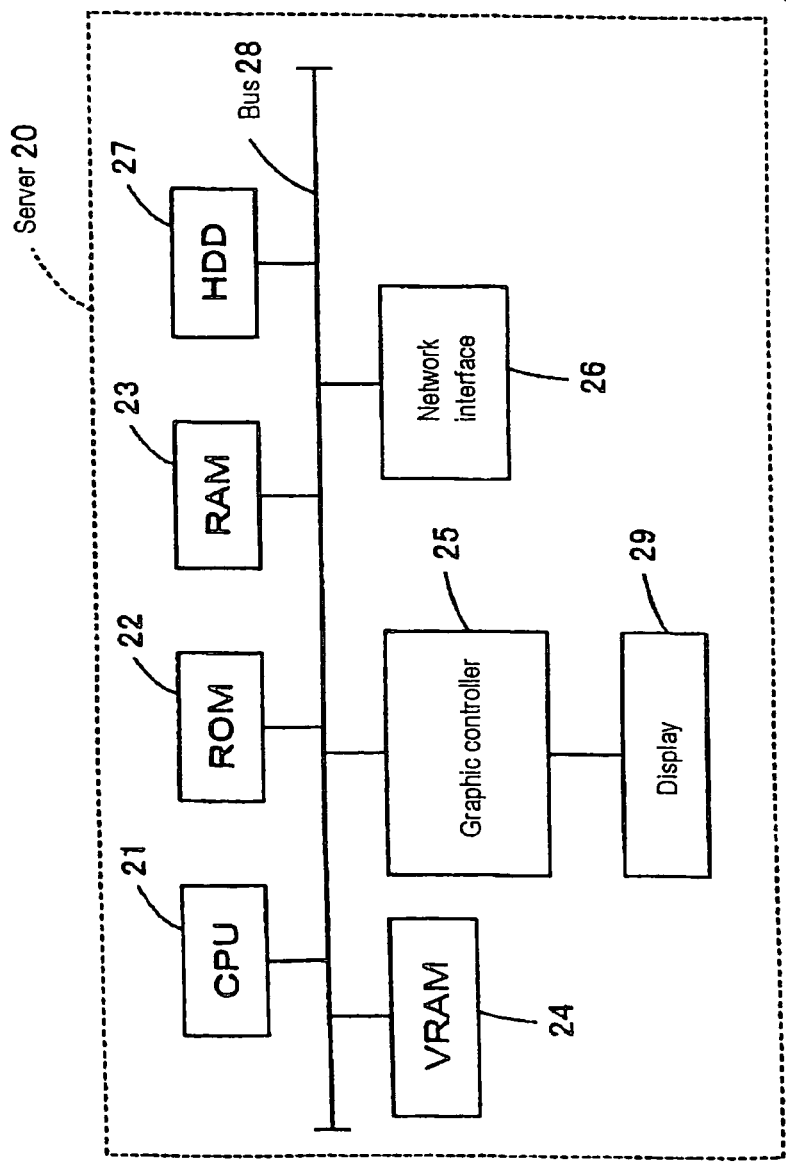
FIG. 2 shows a server hardware configuration.

FIG. 2 shows a hardware configuration of a server 20. In FIG. 2, the server 20 comprises CPU 21, ROM 22, RAM 23, VRAM 24, a graphic controller 25, a network interface 26, and a hard disk drive (HDD) 27. The components 21 through 27 are connected to a bus 28 and can interchange data and control signals with each other. The CPU 21 reads programs from the ROM 22 and the HDD 27 and executes the programs using the RAM 23 as a work area to enable various functions of the server 20. The programs stored in the ROM 22 and the HDD 27 include an operating system and various application programs. A display 29 is connected to the graphic controller 25 and displays images based on image data output from the graphic controller 25.

The network interface 26 uses a wireless LAN to connect the server 20 with the projectors 301 through 30$n$ so as to be capable of intercommunication. Under control of the CPU 21, image data and the like are output to the projectors 301 through 30$n$ via the network interface 26. When the display 29 displays an image, the CPU 21 outputs image data for display on the screen. The image data is written to the VRAM 24. The graphic controller 25 reads the written image data and outputs it to the display 29. The graphic controller 25 receives a drawing instruction from the CPU 21 and provides control to rewrite the VRAM 24 or to determine a resolution for displaying the image data on the display 29 by setting horizontal and vertical frequencies. The image data written to the VRAM 24 is formed in a dot matrix. A screen on the display 29 is also formed in a dot matrix. The dot matrix for the VRAM 24 corresponds to that for the display 29. The display 29 displays an image corresponding to the image data stored in the VRAM 24 as a dot image.

Figure 3:
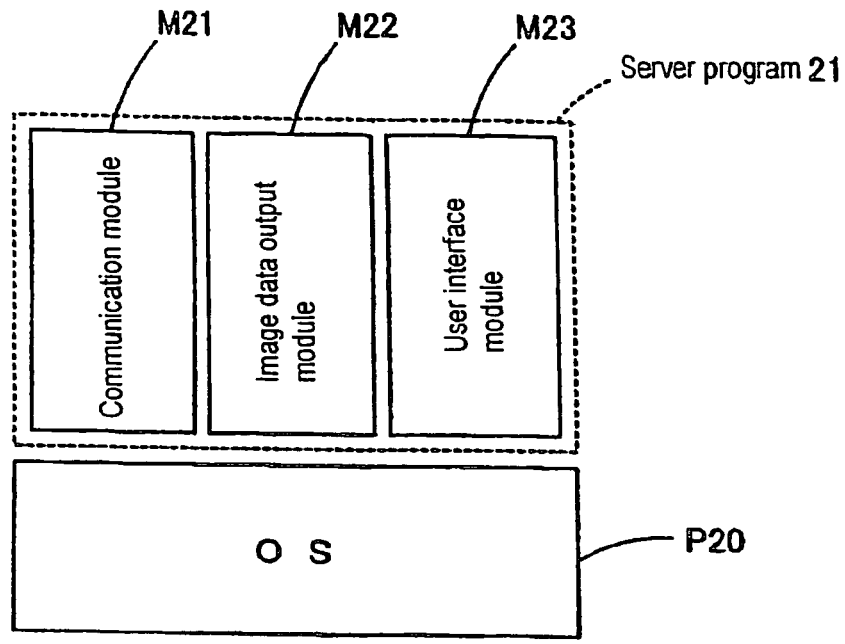
FIG. 3 shows a server software configuration.

FIG. 3 shows a software configuration of the server 20. In FIG. 3, the software includes an operating system (OS) P20 and a server program P21. The OS P20 controls overall control processes for the server 20. The server program P21 implements functions according to the present invention capable of executing processes such as retrieving the projectors 301 through 30$n$ or establishing connections. Of course, the software is not limited thereto and includes drivers such as a printer driver and a display driver and the other application programs. The server program P21 comprises a communication module M21, an image data output program M22, and a user interface module M23. Executing the modules M21 through M23 can implement the functions according to the present invention.

(3) Configuration of the Projector

Figure 4:
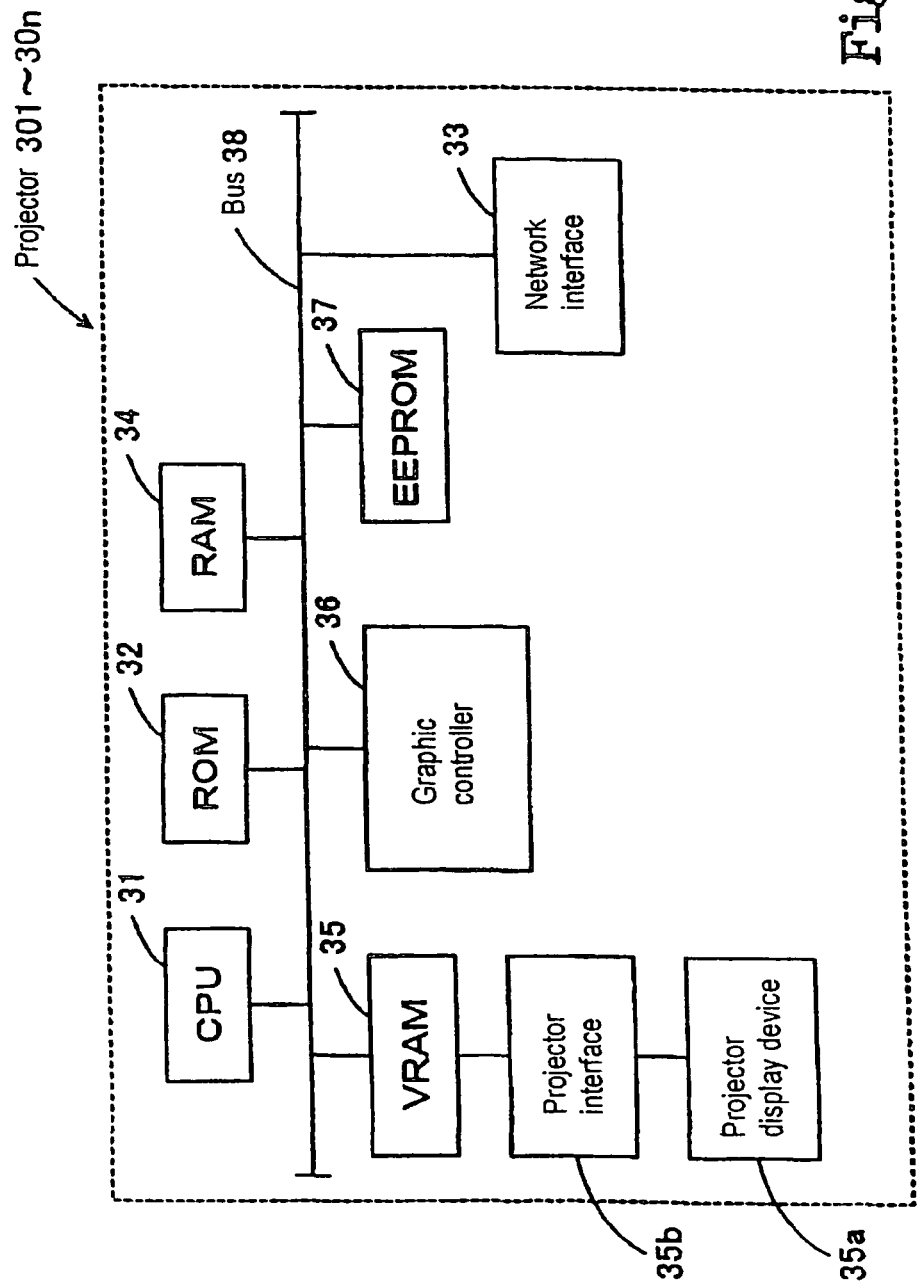
FIG. 4 shows a projector hardware configuration.

FIG. 4 shows a hardware configuration of the projectors 301 through 30$n$. In FIG. 4, the projectors 301 through 30$n$ each comprise a CPU 31, ROM 32, a network interface 33, PAM 34, VRAM 35, a projector display device 35$a$, a projector interface 35$b$, a graphic controller 36, and EEPROM 37. The CPU 31 controls the entire device. The ROM 32 stores initialization programs such as an IPL (Initial Program Loader) that is used for starting the device. The network interface 33 is used for connecting the server 20 by means of a wireless LAN. The RAM 34 stores image data entered from the server 20 via the network interface 33. The VRAM 35 temporarily stores processed image data. The projector display device 35$a$ displays images. The projector interface 35$b$ transfers image data from the VRAM 35 to the projector display device 35a. The graphic controller 36 processes image data from the RAM 34 and controls the VRAM 35. The EEPROM 37 stores control programs and control data for controlling the graphic controller 36. The components 31 through 37 are connected via a bus 38 so as to be able to interchange data and control signals with each other.

Figure 5:
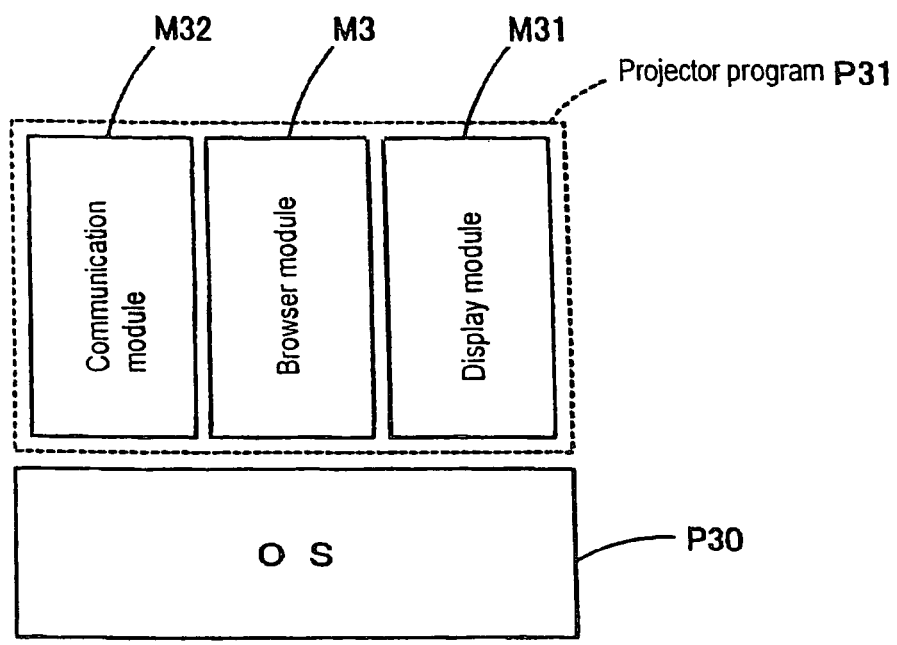
FIG. 5 shows a projector software configuration.

FIG. 5 shows a software configuration of the projector 30. In FIG. 3, the software includes an operating system (OS) P30 and a projector program P31. The OS P30 controls overall image processes for the projector 30. The projector program P31 implements functions according to the present invention. The projector program P31 includes a display module M31 to display reproduced image, a communication module 32 to interchange data with the server 20, and a browser module M33 to process image data and reproduce images to be projected. Executing the modules M31 through M33 can implement the functions according to the present invention.

In the above-mentioned configuration, a user of the server 20 executes the server program P21 and allows the projectors 301 through 30n to execute the projector program P31. This makes it possible to provide a connection capable of intercommunication between the server 20 and the projectors 301 through 30n and permit the server 20 to output image data. The connected projectors 301 through 30n can project images based on the image data. The following describes processes executed by the server program P21 and the projector program P31.

(4) Contents of the Server Process

Figure 6:
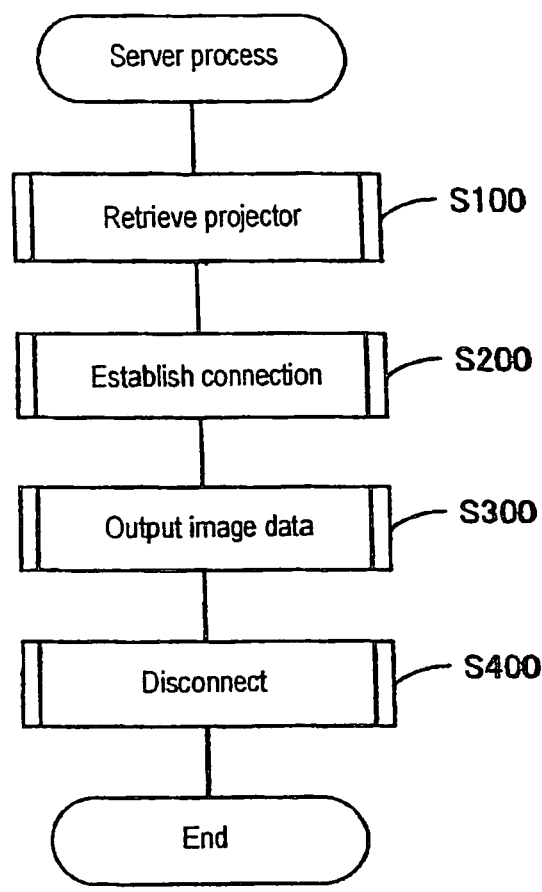
FIG. 6 is a flowchart outlining a server process implemented by a server program on the server.

FIG. 6 is a flowchart outlining a server process implemented by the server program P21 on the server 20. In FIG. 6, the server 20 first executes a projector retrieval process to retrieve connectable projectors from the projectors 301 through 30n (step S100). When the connectable projectors 301 through 30n are retrieved, the server 20 selects any intended projectors from the connectable projectors 301 through 30n that should output image data for displaying images. In addition, the server 20 executes a connection establishment process to establish connection to the selected projectors 301 through 30n (step S200). The server 20 then executes an image data output process to output image data for allowing the connected projectors 301 through 30n to display images (step S300). When image data need not be output to the projectors 301 through 30n, the server 20 executes a disconnection process to disconnect from the connected projectors 301 through 30n (step S400).

Figure 7:
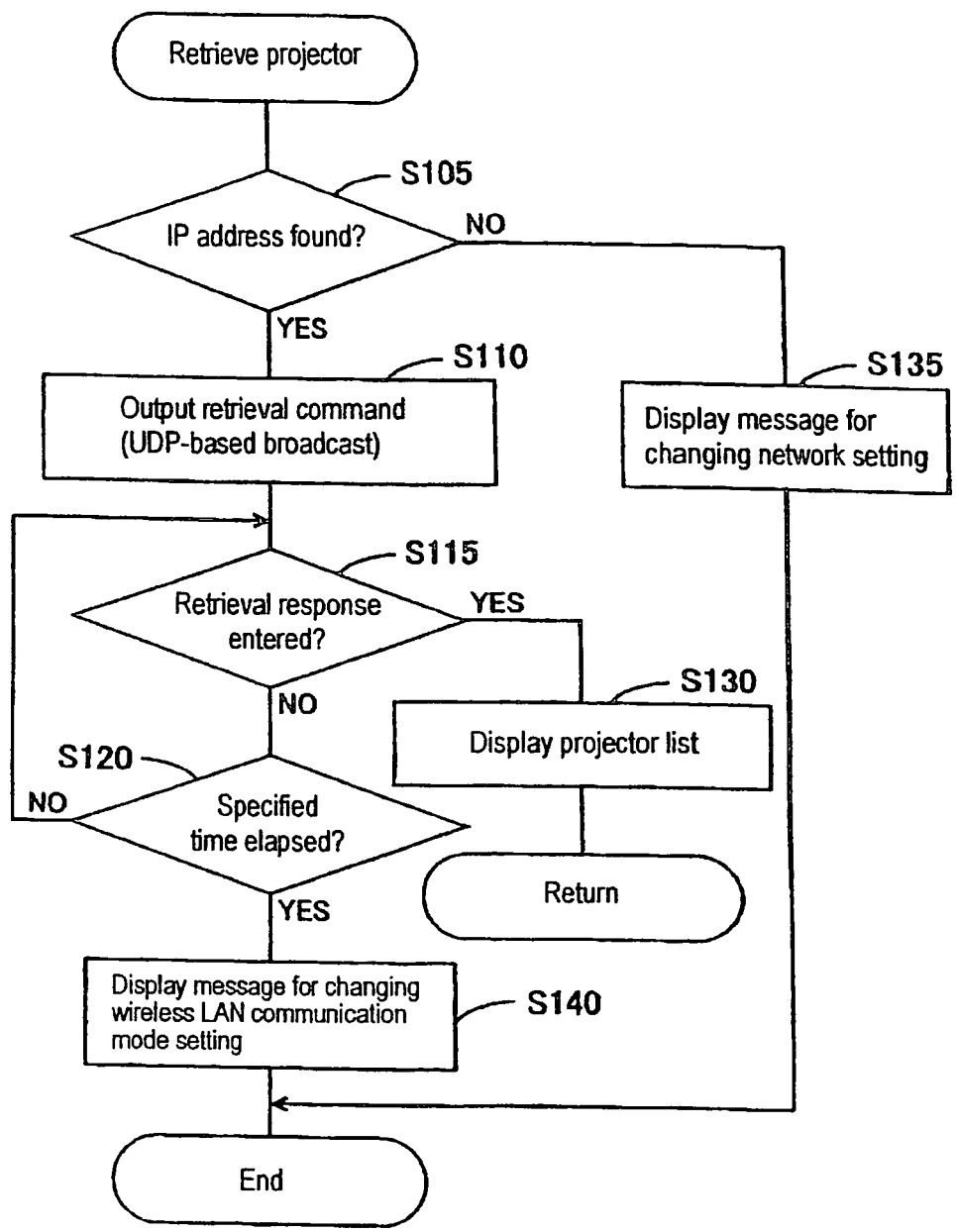
FIG. 7 is a flowchart showing the contents of a projector retrieval process.

FIG. 7 is a flowchart showing the contents of the projector retrieval process at step S100. In FIG. 7, the process first retrieves a specified storage area in the HDD 27 that stores IP addresses to determine whether or not an IP address is allocated to the server 20 (step S105). If the IP address is allocated, the process outputs a retrieval command containing this IP address to the projectors 301 through 30n. At this time, the process uses the broadcast based on the UDP communication protocol to output the retrieval command (step S110). Then, it is determined whether or not the projectors 301 through 30n output a retrieval response to the retrieval command and this response is input (step S115). When no retrieval response is input, the process checks for input of the retrieval response until a specified time expires (step S120). When it is determined at step S115 that the retrieval response is input, the process displays a projector list screen 40 to visually provide a user with the connectable projectors 301 through 30n (step S130).

Figure 8:
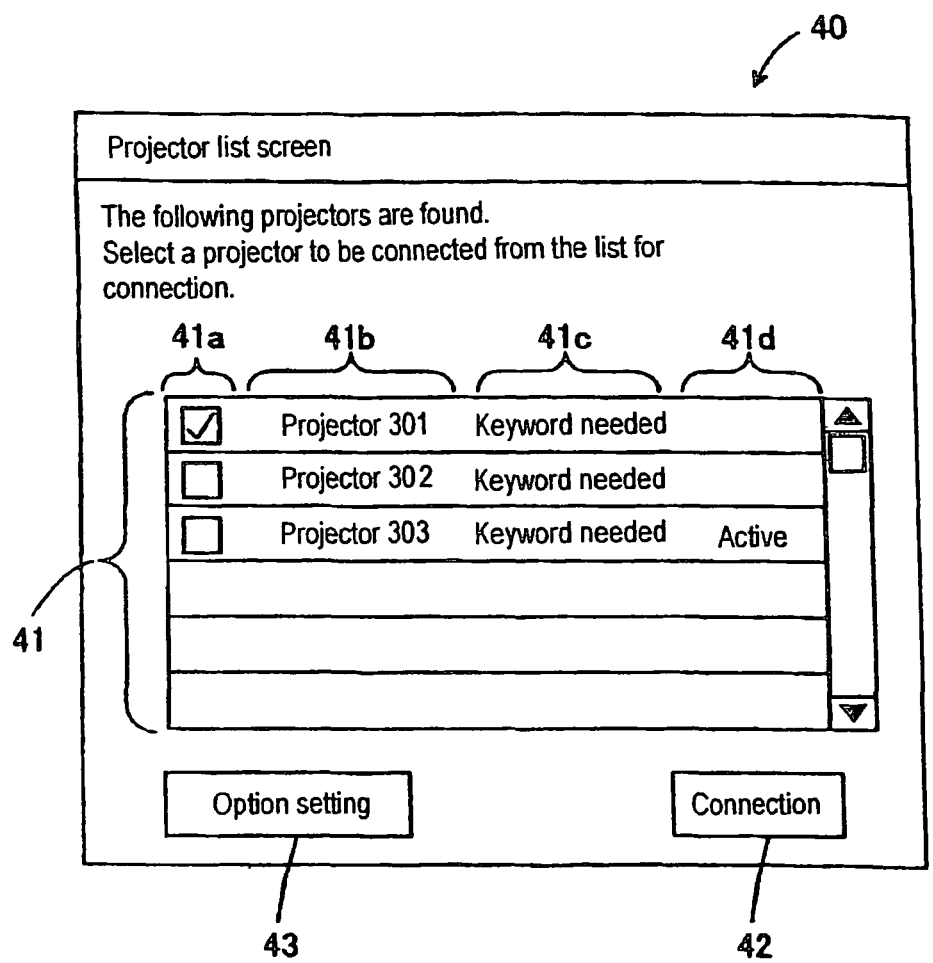
FIG. 8 shows a configuration of a projector list screen.

As will be discussed below, the retrieval response includes unique information such as MAC addresses about the projectors 301 through 30n that returned the retrieval response, information about usage of the projectors 301 through 30n, and keyword information indicating whether or not the authentication using a keyword is needed during connection establishment. The projector list screen 40 will now be described. In FIG. 8, the projector list screen 40 presents a message such as "The following projectors are found..." The projector list screen 40 contains a projector list 41, a connection button 42, and an option setting button 43. The projector list 41 comprises a selection check box 41a, a projector name column 41b, a keyword information column 41c, and a usage information column 41d.

According to the embodiment, the projectors 301 through 303 are connectable. The projectors 301 through 303 need the authentication of keywords for connection. The projector 303 already makes connection with another server and is being used. When it is determined at step S105 that no IP address is given, the screen shows a message indicating that the network setting needs to be changed, prompting a user to set an IP address (step S135). When it is determined at step S120 that no retrieval response is input, a different communication mode is assumed (i.e., ad-hoc mode instead of infrastructure mode). The screen shows a message indicating that the communication mode for the wireless LAN needs to be changed to the infrastructure mode, prompting the user to change the communication mode (step S140). When the projector list screen 40 is displayed at step S130 above, control advances to the connection establishment process.

Figure 9:
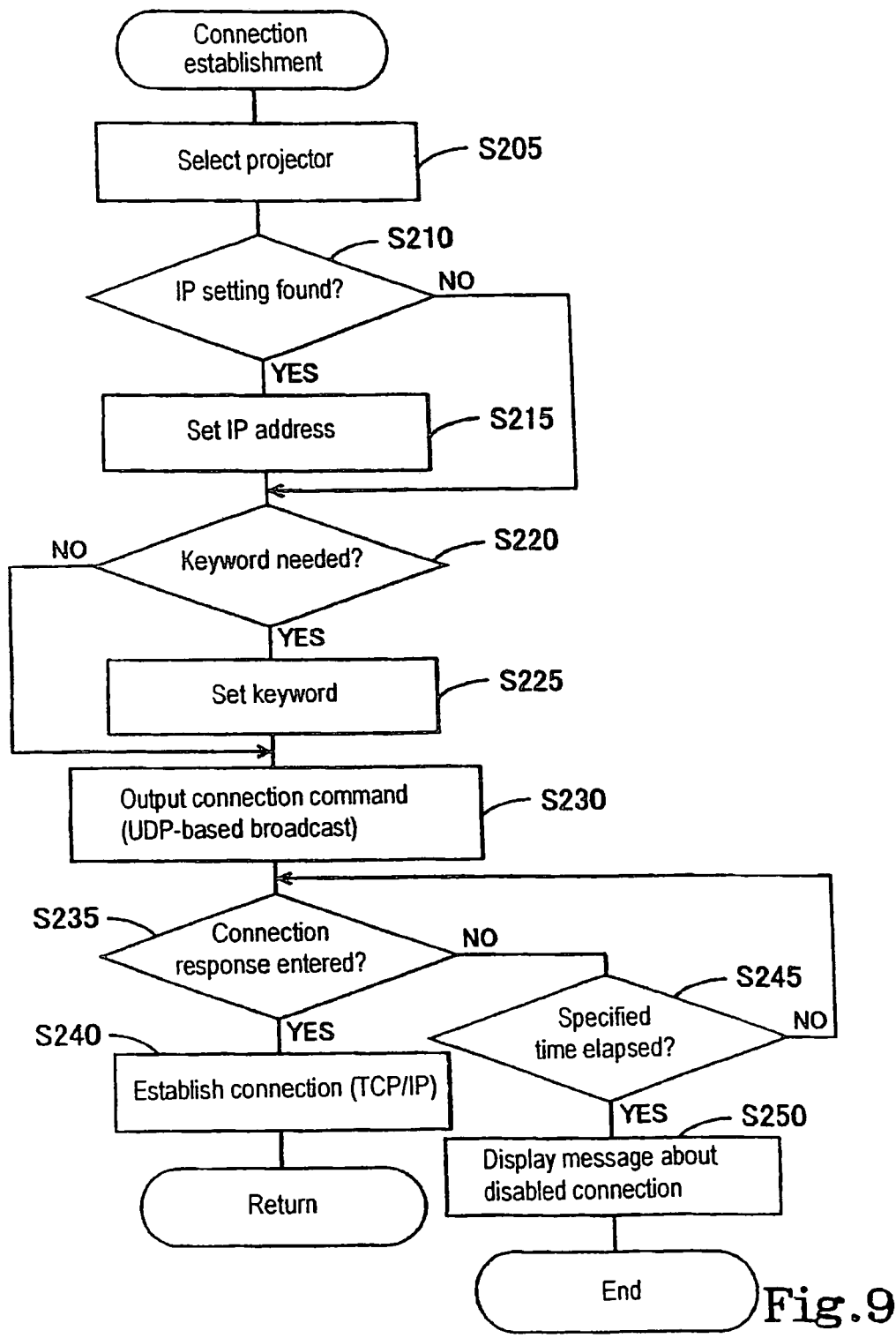
FIG. 9 shows the contents of a connection establishment process.
Figure 10:
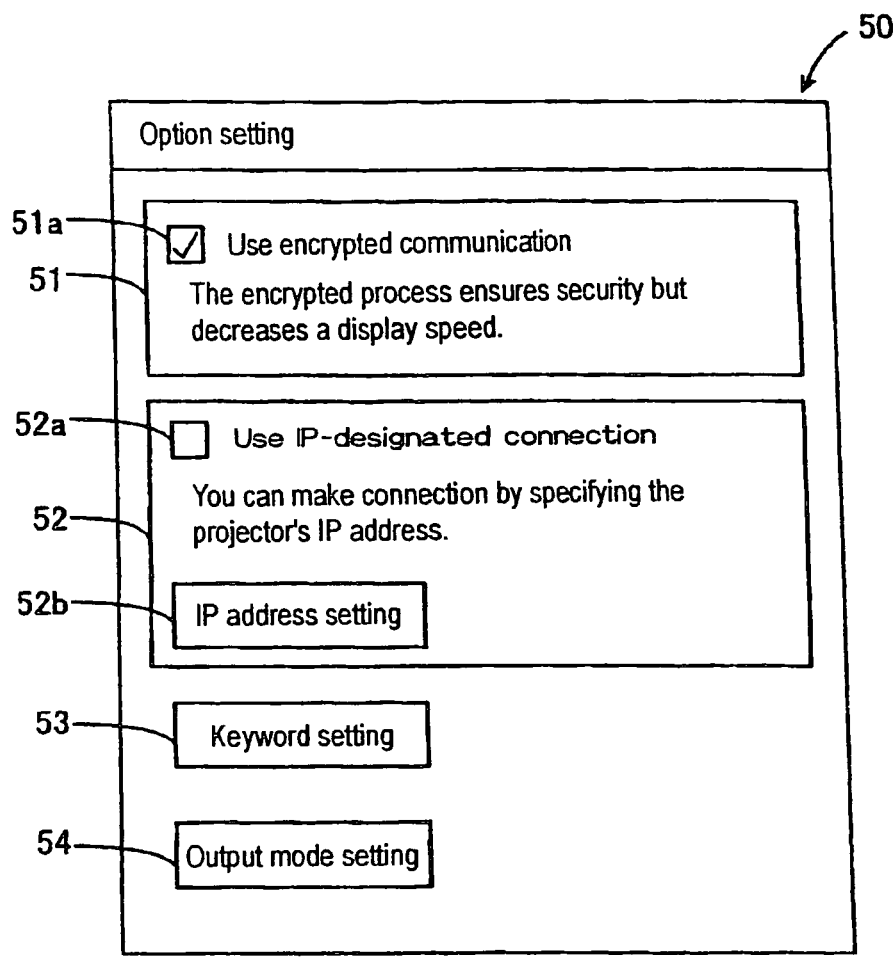
FIG. 10 shows a configuration of an option setting screen.

FIG. 9 is a flowchart showing the contents of the connection establishment process at step S200. When establishing a connection in FIG. 9, a user selects intended projectors from the projectors 301 through 30n shown in the projector list 41 on the projector list screen 40. The embodiment shows a case where the user checks the selection check box 41a for the projector 301 to select it (step S205). The process then determines whether or not an IP-designated connection is specified (step S210). The IP-designated connection can be specified on an option setting screen that is displayed when the option setting button 43 is selected on the projector list screen in FIG. 8. FIG. 10 shows a configuration of the option setting screen. In FIG. 10, the option setting screen 50 comprises option setting items such as an encryption setting column 51, an IP-designated connection setting column 52, a keyword setting button 53, and an output mode setting button 54.

Figure 11:
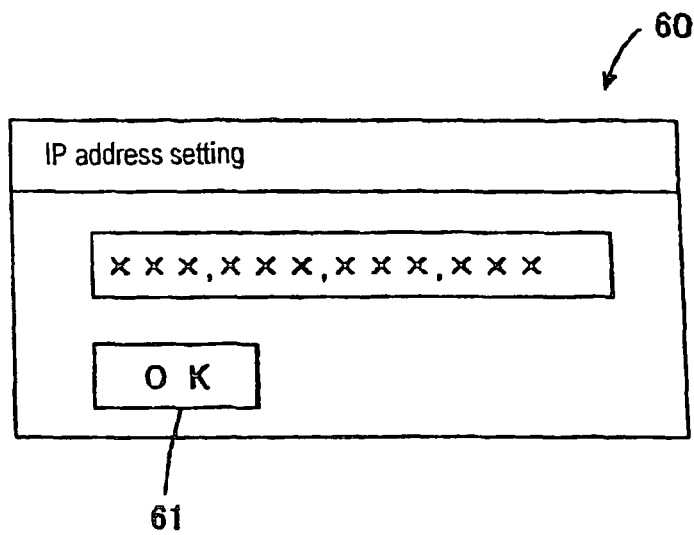
FIG. 11 shows a configuration of an IP address setting screen.

The IP-designated connection setting column 52 is selected when a specific IP address is specified for the projector 301 to be connected based on the setting of the server 20. The IP-designated connection setting column 52 can be selected by checking the check box 52a. The embodiment shows that the check box 52a is unchecked. In this case, the projector 301 will be assigned an IP address by the projector process executed on the projector 301. When the check box 52a is checked to select the IP-designated connection, a user selects the IP address setting button 52b including in the IP-designated connection setting column 52 to display an IP address setting screen 60 in FIG. 11. Using this screen, the user can enter an intended IP address. After entering an intended IP address on the IP address setting screen 60, the user selects an OK button 61. This determines the specific IP address to be assigned to the projector 301 (step S215). Then, it is determined whether or not the authentication using a keyword is needed for establishing a connection to the projector 301 (step S220).

As shown in FIG. 8, the embodiment defines the keyword information to be "keyword needed" for the projector 301.

Figure 12:
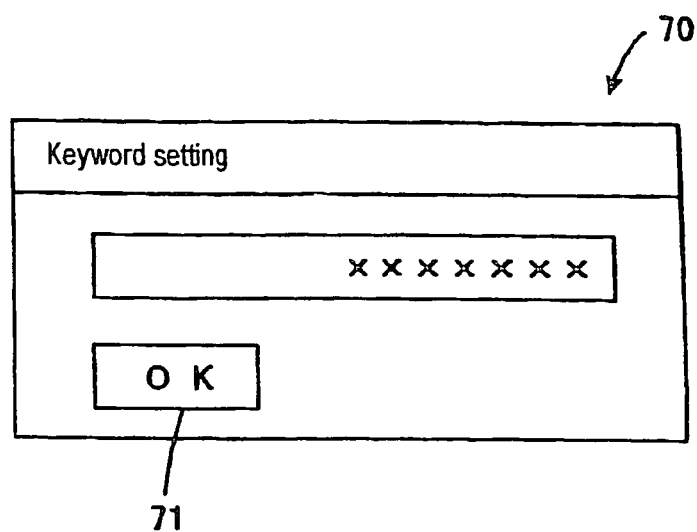
FIG. 12 shows a configuration of a keyword setting screen.

The user selects the keyword setting button 53 on the option setting screen 50 to display a keyword setting screen 70 in FIG. 12 and enter a specified keyword (step S225). In this case, the projector 301 projects the keyword as will be described later. Accordingly, the user visually checks the projected keyword and enters it on the keyword setting screen 70. After pressing an OK button 71 to complete the keyword setting, the user can press the connection button 42 on the projector list screen 40 to output a connection command containing the specified keyword to the projectors 301 through 30n. (When the IP-designated connection is specified, the connection command also contains the IP address specified on the IP address setting screen 60.)

At this time, there is not yet established a TCP/IP-based connection. The process broadcasts the connection command based on the UDP communication protocol (step S230). It is determined whether or not a connection response to the connection command is input from the projector 301 (step S235). When the connection response is input, the process establishes the connection with the projector 301 based on TCP/IP (step S240). When no connection response is input at step S235 and a specified time has elapsed (step S245), the process displays a message indicating an unsuccessful connection and notifies the user of this (step S250). When the connection with the projector 301 is established at step S240, an intercommunication starts between the server and the projector 301. The server 20 becomes able to output image data to the projector 301 and executes the image data output process to be described next.

Figure 13:
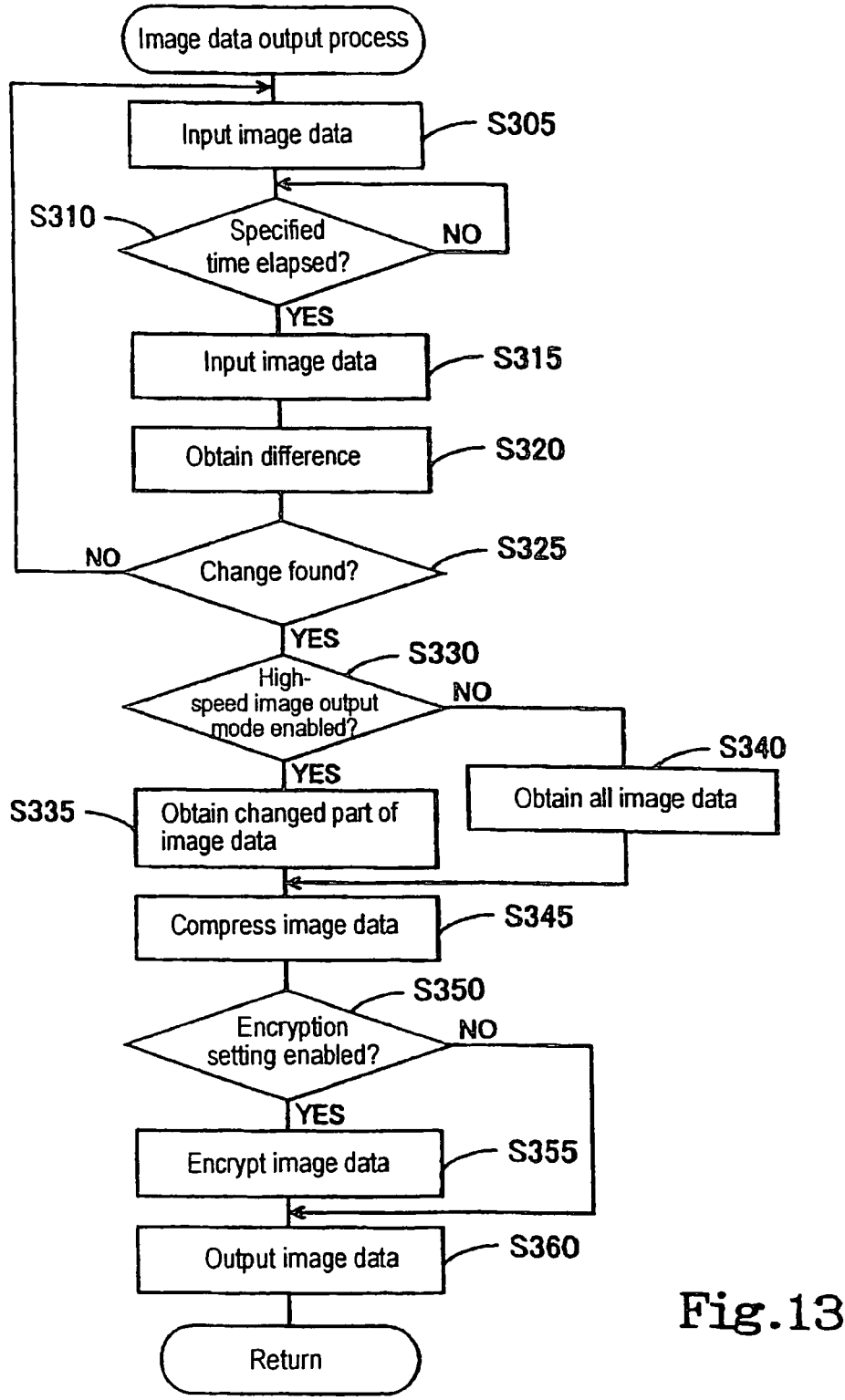
FIG. 13 is a flowchart showing the contents of an image data output process.

FIG. 13 is a flowchart showing the contents of the image data output process at step S300. In FIG. 13, the process first inputs image data for the image displayed on the display 29 from the VRAM 24 (step S305). After a specified time elapses (step S310), the process reinputs image data from the VRAM 24 (step S315). The process compares the image data input at step S305 with image data input at step S315 and obtains a difference (step S320). The process determines whether or not there is a change in the image displayed on the display 29 based on whether or not the difference is greater than or equal to a specified threshold value (step S325). When the difference is smaller than the threshold value, the process assumes the image to be unchanged and repeats steps S305 to S320. When the image is assumed to be changed at step S325, the process determines whether or not a high-speed image output mode is enabled (step S330).

Figure 14:
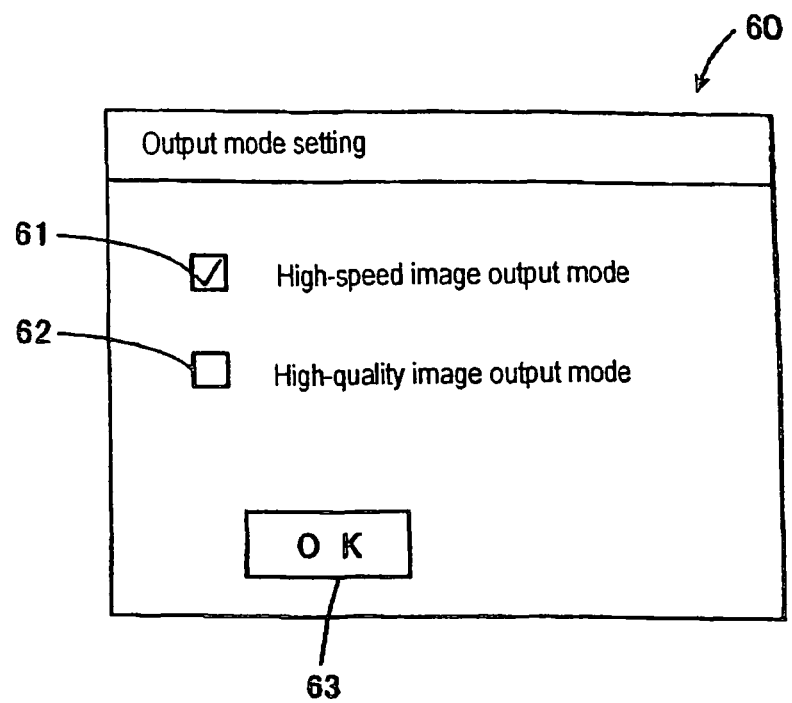
FIG. 14 shows a configuration of an output mode setting screen.

This output mode can be specified by selecting the output mode setting button 54 on the option setting screen 50 in FIG. 10 and displaying the output mode setting screen 60 in FIG. 14. In FIG. 14, the output mode setting screen 60 allows selection of output modes such as a high-speed image output mode 61 and a high-quality image output mode 62. When an image changes, the high-speed image output mode 61 outputs image data only for the changed portion to accelerate the display process. When an image changes, the high-quality image output mode 62 outputs the entire image data to ensure the image quality. The user selects one of the modes 61 and 62 and then presses an OK button 63. This determines the output mode. When it is determined at step S330 that the high-speed image output mode is selected, the process obtains image data for the changed portion from the VRAM 24 (step S335).

On the other hand, when it is determined at step S330 that the high-quality image output mode is selected, the process obtains the entire image data from the VRAM 24 (step S340). When the image data for the changed portion or the entire image data is obtained, the obtained image data is compressed (step S345). After the image data is compressed, it is determined whether or not an encryption setting is enabled (step S350). The encryption setting is used to encrypt image data to be output. The encryption setting can be specified using the encryption setting column 51 on the option setting screen 50 in FIG. 10. To enable the encryption setting, the user checks a check box 51a. When it is determined at step S350 that the encryption setting is enabled, the process encrypts the compressed image data (step S355).

This encryption uses an existing technology. On the other hand, no encryption is performed when no encryption setting is assumed to be enabled. The process outputs the encrypted or unencrypted image data to the projector 301 (step S360). When a change is made to the image displayed on the display 29 of the server 20, the image data output process outputs the image data only for the changed portion. Here, let us suppose that the process obtains the image data for the changed portion at step S335 and outputs this image data to the projector 301. In this case, the projector 301 combines this partial image data with the stored image data before the change to form the image data after the change.

When the changed portion is obtained, it may be preferable to divide the image into a plurality of blocks beforehand and to transmit a block that contains the changed portion. Depending on a compression technique, determining block divisions can surely prevent the compression from covering a plurality of areas when one block needs to be transmitted. Therefore, it is possible to decrease the size of image data to be transmitted.

Figure 15:
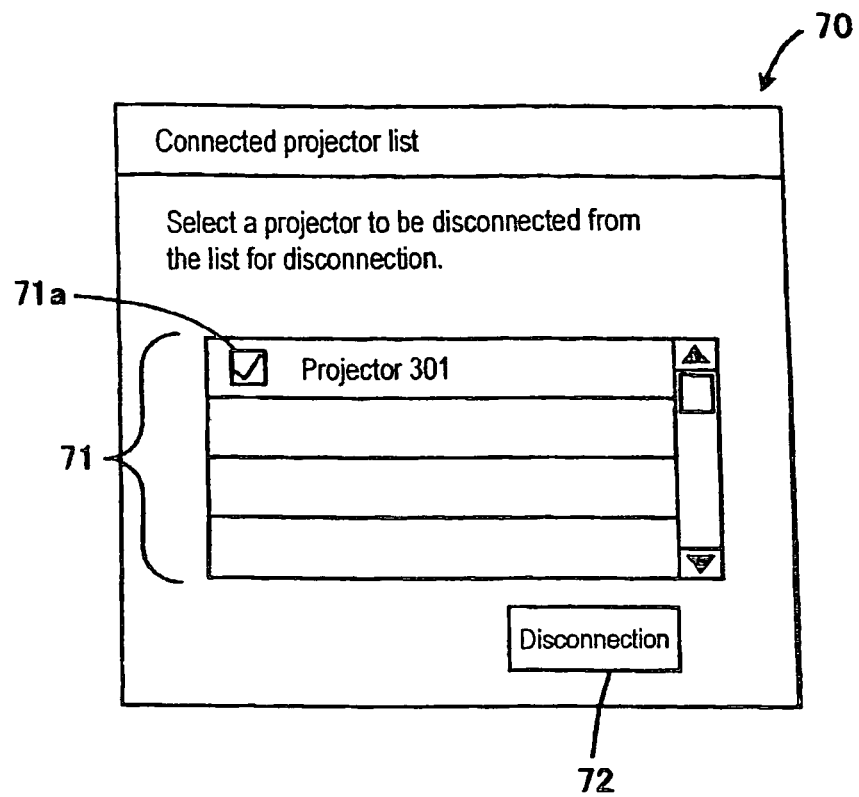
FIG. 15 is a flowchart showing the contents of an image display process.
Figure 16:
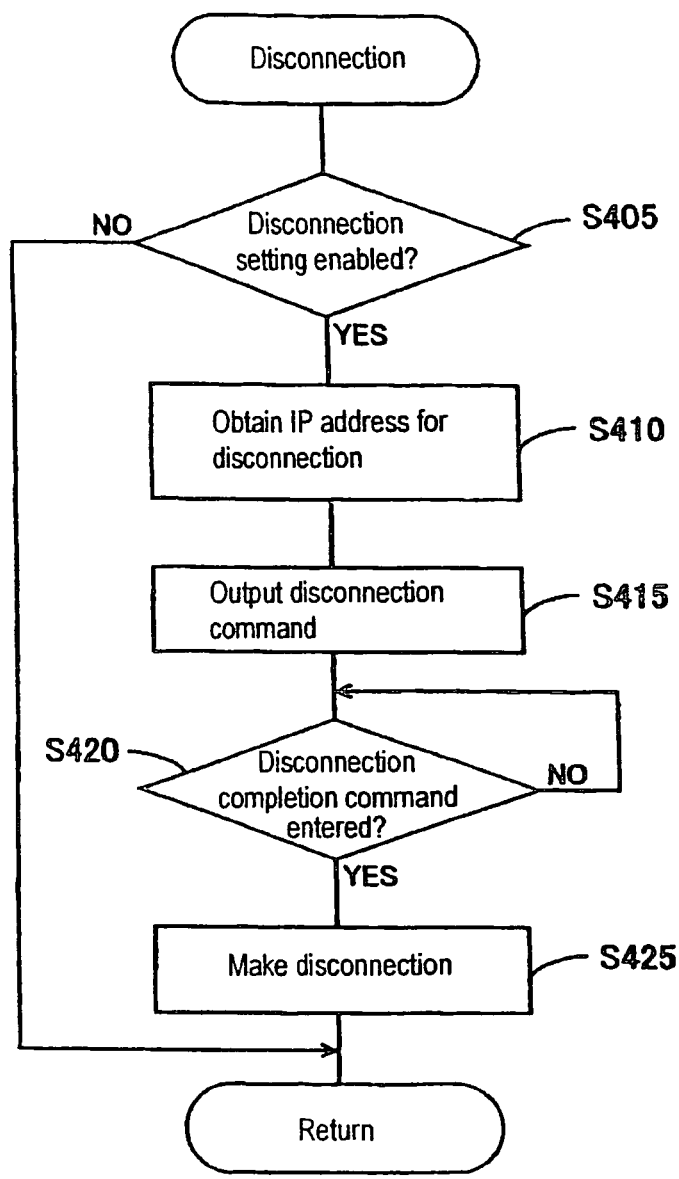
FIG. 16 shows a configuration of a connected projector list screen.

After using the projector 301, the user of the server 20 displays a connected projector list screen 70 in FIG. 15 on the server. In FIG. 15, the connected projector list screen 70 contains a connected projector list 71. The user checks a check box corresponding to the projector to be disconnected and presses a disconnection button 72 to execute the disconnection process at step S400. FIG. 16 is a flowchart showing the contents of the disconnection process. In FIG. 16, it is determined whether or not the disconnection button 72 is selected and pressed on the connected projector list screen 70 (step S405). When it is determined that the disconnection button 72 is selected and pressed, the process obtains an IP address assigned to the projector to be disconnected, e.g., the projector 301 in this embodiment (step S410). The process outputs a disconnection command including the IP address (step S415). The process then determines whether or not a disconnection completion command is entered from the projector 301 in response to the disconnection command (step S420). When the disconnection completion command is entered, the connection is disconnected (step S425).

(5) Contents of the Projector Process

Figure 17:
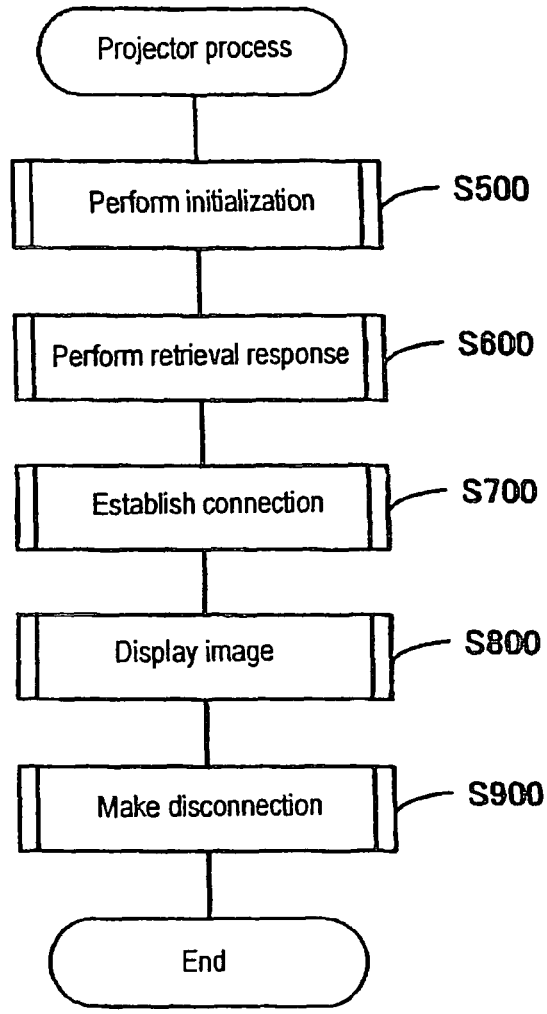
FIG. 17 is a flowchart showing the contents of a projector process.

The following describes the projector program P31. FIG. 17 is a flowchart showing the contents of the projector process. In FIG. 17, when the power is turned on, the projectors 301 through 30n execute an initialization process to temporarily assigns IP addresses to themselves (step S500). When the initialization process is complete, control advances to a wait state for a retrieval command supplied from the server 20. Then, a retrieval response process is executed to respond to the retrieval command (step S600). A connection establishment process is executed to establish a connection to the server (step S700). An image display process is executed to image data output from the connected server 20 (step S800). Finally, a disconnection process is executed in response to a disconnection request from the server 20 (step S900).

Figure 18:
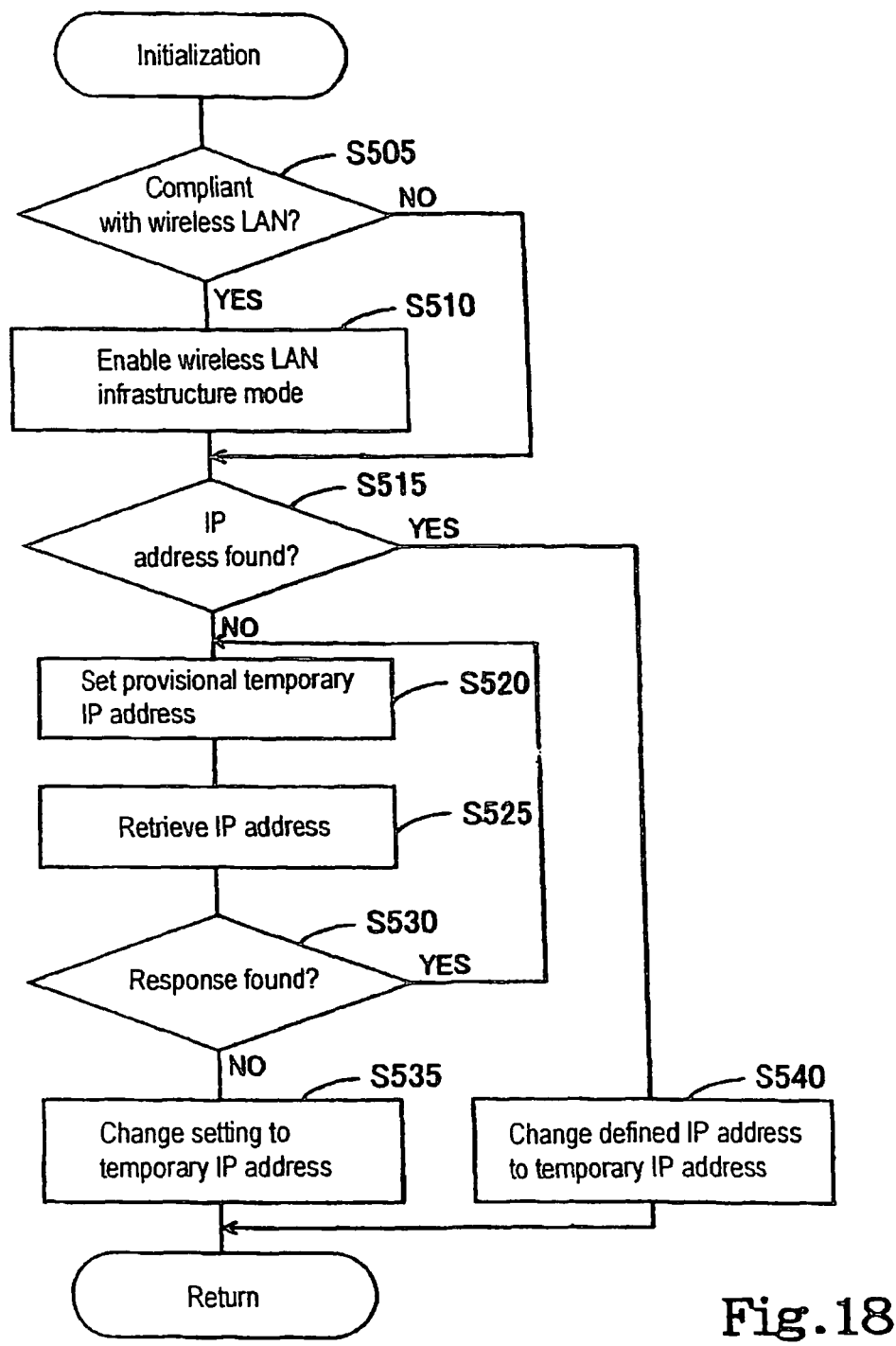
FIG. 18 is a flowchart showing the contents of an initialization process.

FIG. 18 is a flowchart showing the contents of the initialization process at step S500. In FIG. 18, when the power is turned on, the projectors 301 through 30n determine whether or not the network interface 33 is compliant with a wireless LAN (step S505). When it is determined that the network interface 33 is compliant with a wireless LAN, the process sets the communication mode to the infrastructure mode (step S510). The projectors 301 through 30n then determine whether or not IP addresses are assigned (step S515). When it is determined that no IP address is assigned to any of the projectors 301 through 30n, the process assigns a specified IP address in a provisional temporary manner (step S520). Based on the provisional temporary IP address, the process executes a retrieval to check if there is a network device having a conflicting IP address on the network (step S525).

A Ping command is used for this retrieval. If there is a network device assigned with the same IP address as the provisional temporary IP address, the network device should return a response notifying the conflict. Accordingly, the process determines whether or not the response returns (step S530). When it is determined that no response returns, the process temporarily assigns the provisional temporary IP address to the projectors 301 through 30n (step S535). When it is determined that the response returns, the process uses another IP address for the provisional temporary assignment and checks if there is a conflicting network device. The process repeats the retrieval using the provisional temporary assignment of IP addresses until no conflicting network device is detected. When it is determined that the IP address is already assigned, the process temporarily assigns this IP address to the projectors 301 through 30n (step S540).

Figure 19:
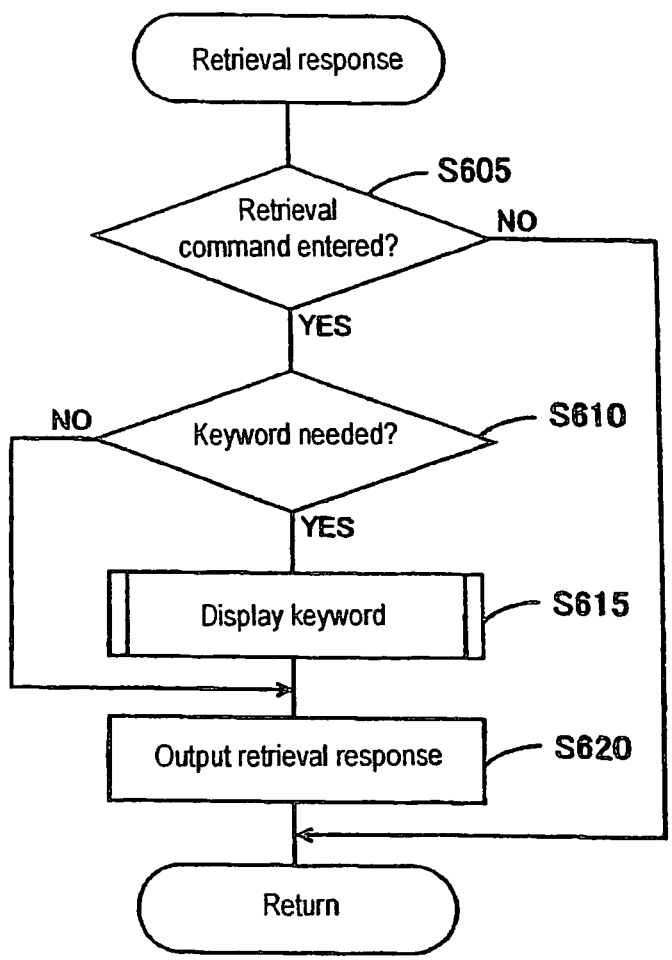
FIG. 19 is a flowchart showing the contents of a retrieval response process.

FIG. 19 is a flowchart showing the contents of the retrieval response process at step S600. In FIG. 19, when the initialization process at step S500 terminates, the projectors 301 through 30n wait for input of the retrieval command output from the server 20, i.e., enter a wait state by determining whether or not the retrieval command is input (step S605). When it is determined that the retrieval command is input, the process determines whether or not the authentication using a keyword is needed for the server 20 to establish a connection to the projector 301 (step S610). The setting in the projectors 301 through 30n determines whether or not the authentication using a keyword is needed. When it is determined that the authentication using a keyword is needed, a keyword display process is executed to project the keyword so that the user of the server 20 can visually check it (step S615). A flowchart in FIG. 20 shows the contents of the keyword display process.

Figure 20:
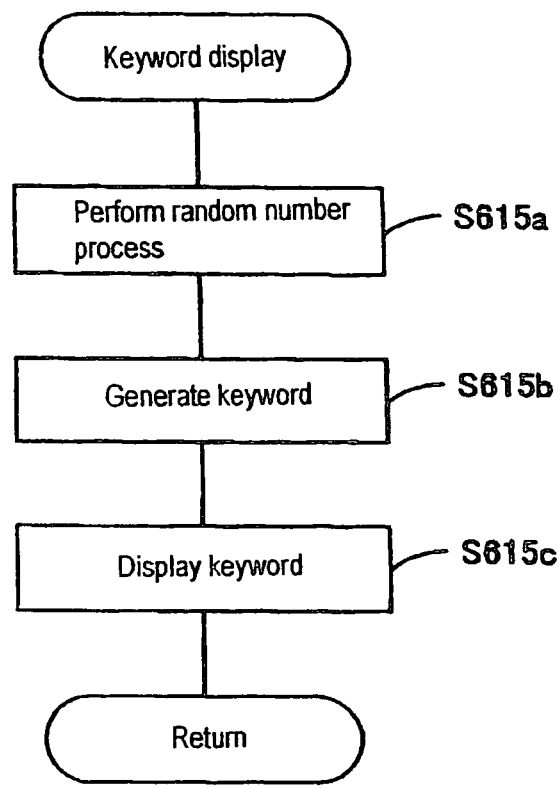
FIG. 20 is a flowchart showing the contents of a keyword display process.
Figure 21:
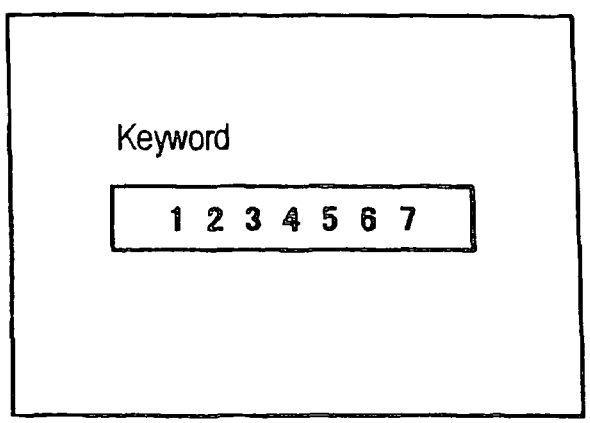
FIG. 21 shows an example mode of keyword display images.

In FIG. 20, a random number process is first executed to generate a keyword to be displayed (step S615a). Based on the random number process, the keyword display process generates a keyword comprising a 7-digit numeric string (step S615b) and projects the generated keyword (step S615c). Of course, it is possible to appropriately change the keyword so that it contains not only a numeric string, but also letters and symbols. On a screen, a keyword display image is projected as shown in FIG. 21. The user of the server 20 visually confirms the keyword projected on the screen and specifies this keyword for the connection establishment process at step S200 described above to issue the connection command. When the keyword display process at step S615 terminates, the retrieval response process outputs a retrieval response including the unique information (such as MAC addresses, etc.) about the projectors 301 through 30n, the usage information, and the keyword information indicating whether or not the keyword is needed (step S620). Here, the usage information provides a state of connection to the other servers. When the other servers are connected, the usage information shows an "active" state. When no servers are connected, the usage information shows an "inactive" state. The usage information is displayed on the projector list screen 40 in FIG. 8. According to the embodiment, as shown in FIG. 8, the projectors 301 through 30n output the retrieval response.

Figure 22:
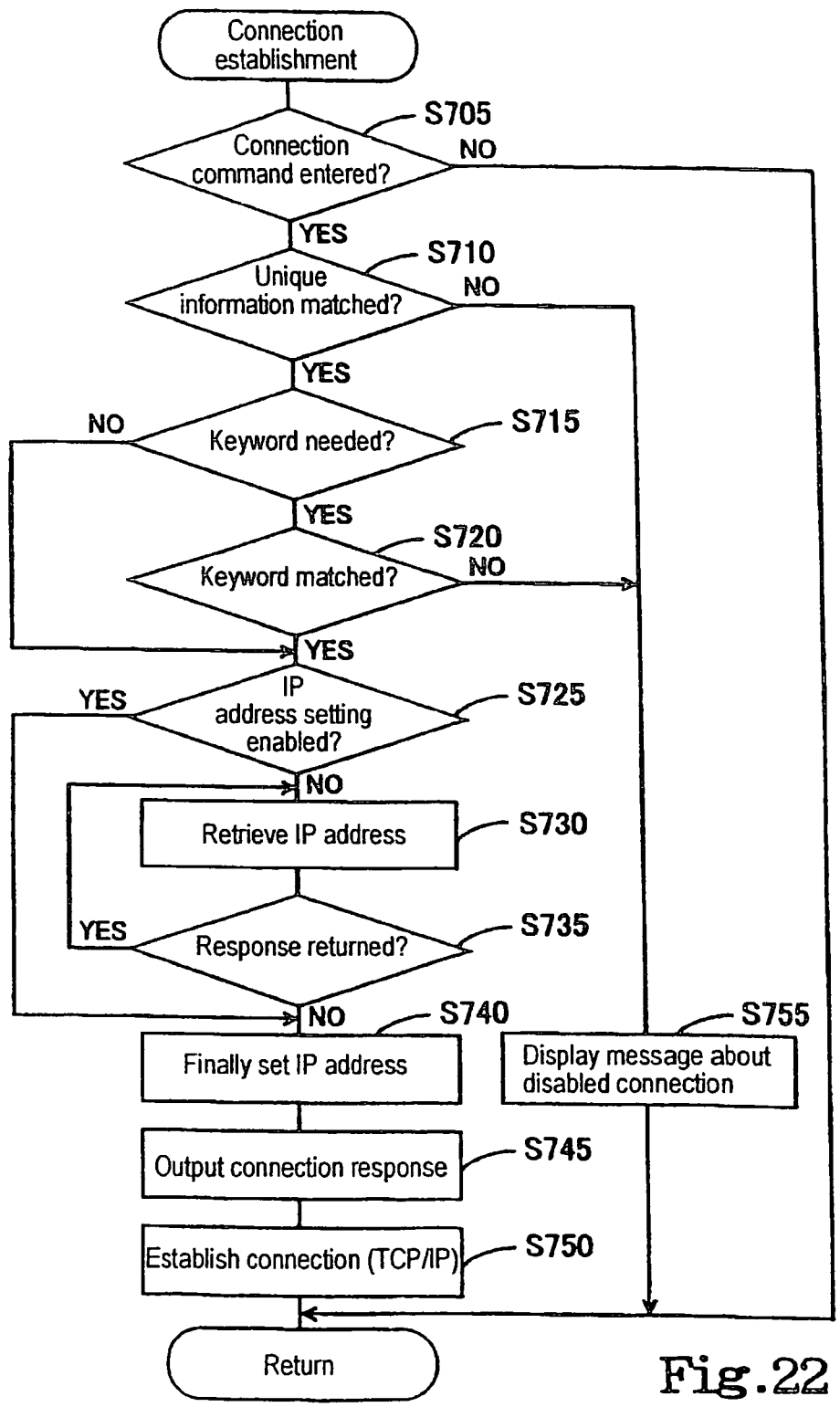
FIG. 22 is a flowchart showing the contents of a connection establishment process.

FIG. 22 is a flowchart showing the contents of the connection establishment process at step S700. In FIG. 22, when the retrieval response process at step S600 outputs the retrieval response to the server, the connection establishment process waits for input of a connection command in response to the retrieval response from the server 20, i.e., enters a wait state by determining whether or not the connection command is input (step S705). When it is determined that the connection command is input from the server 20, the process checks the unique information included in the connection command (step S710). When it is determined that the unique information matches, the process determines whether or not the authentication using a keyword is needed (step S715). When the authentication using a keyword is needed, the process determines whether or not the keyword included in the connection command matches, i.e., is normal (step S720).

When it is determined that the keyword matches, the process then determines whether or not the connection command includes the IP address setting. When an IP address is defined in the connection command, it means that the server 20 selects the IP-designated connection (step S725). When no IP address is defined in the connection command, a specified IP address is defined. Based on this IP address, the process executes a retrieval to check if there is a network device having a conflicting IP address on the network (step S730). A Ping command is used for this retrieval. If there is a network device assigned with the same IP address as the specified IP address, the network device should return a response notifying the conflict. Accordingly, the process determines whether or not the response returns (step S735). When it is determined that no response returns, the process finally assigns the IP address defined at step S730 to the projector 301 (step S740). When it is determined at step S725 that an IP address is defined in the connection command, the process finally assigns the IP address defined in the connection command to the projector 301 at step S740.

When it is determined that a response returns, the process assigns another IP address and checks if there is a conflicting network device. The process repeats the retrieval until no conflicting network device is detected. After the IP address has been finally assigned, the process outputs a connection response to the server 20 (step S745). This establishes a TCP/IP connection with the server 20 and starts intercommunication with the server 20 (step S750). When it is determined at steps S710 and 720 that there is no matching unique information or keyword, the process projects a message indicating an unsuccessful connection, allowing the user of the server 20 to visually confirm the message (step S755). When the intercommunication with the server 20 starts at step S750, the server 20 can input image data. Then, the client executes the image display process to be described next.

Figure 23:
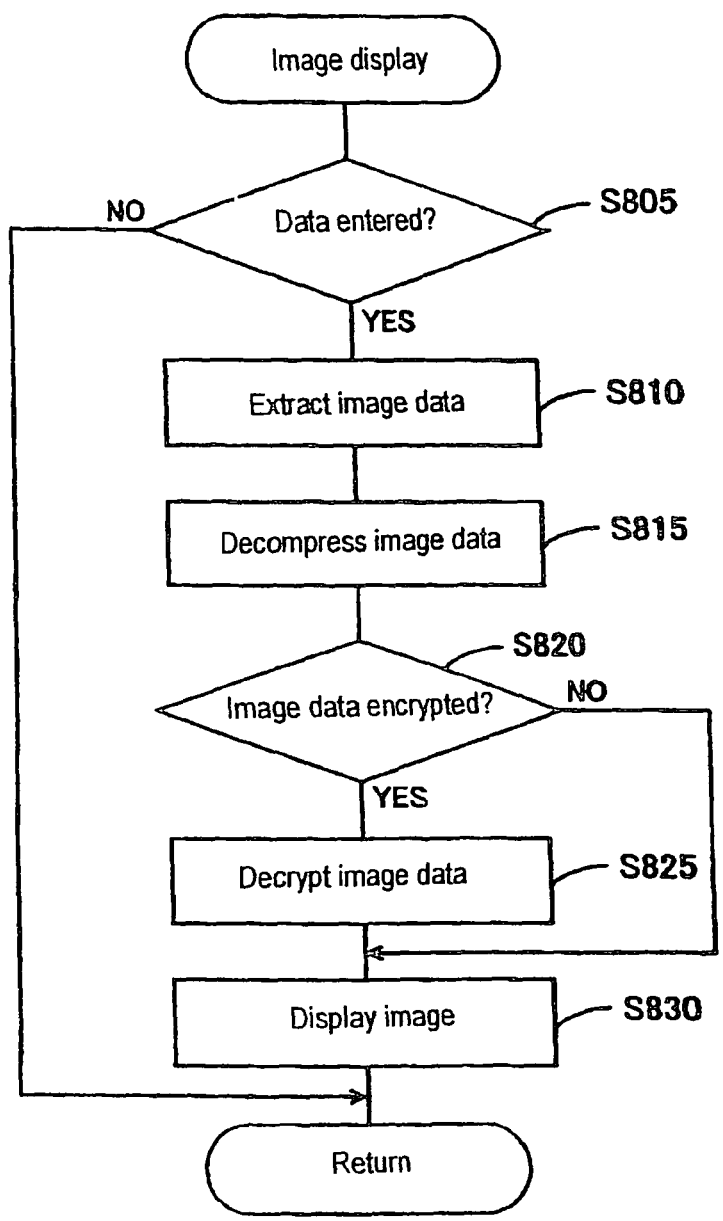
FIG. 23 is a flowchart showing the contents of an image display process.

FIG. 23 is a flowchart showing the contents of the image display process. In FIG. 23, the process determines whether or not data is input from the server 20 (step S805). When it is determined that data is input, the process extracts image data from this data (step S810). Since the extracted image data is compressed, the process decompresses the compressed image data (step S815). The process then determines whether or not the decompressed image data is encrypted (step S820). When the image data is encrypted, the process decrypts the image data (step S825). Based on the image data, the process displays an image (step S830).

Figure 24:
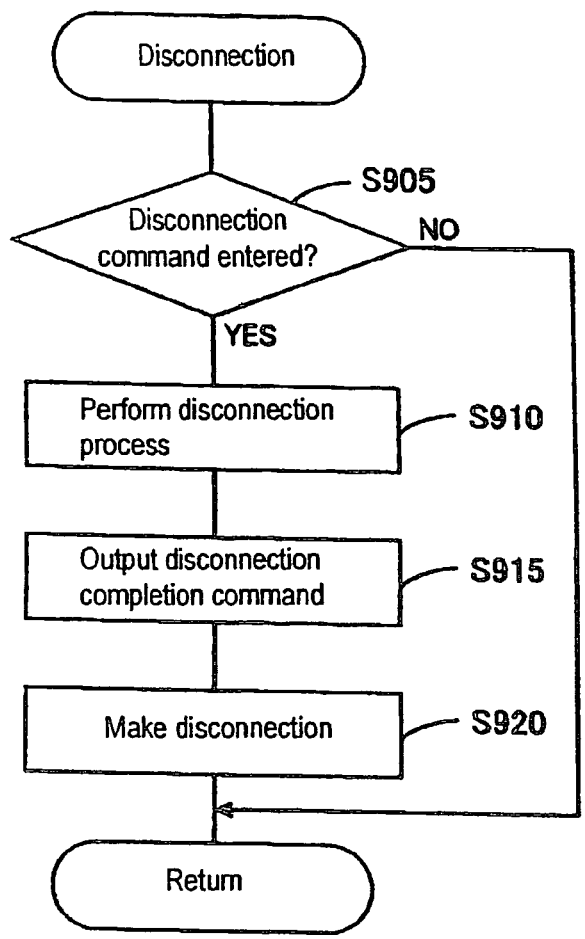
FIG. 24 is a flowchart showing the contents of a disconnection process.

FIG. 24 is a flowchart showing the contents of the disconnection process. In FIG. 24, the connection established with the server 20 can be disconnected in response to the disconnection process in the server 20. The process first awaits a disconnection command issued from the server (step S905). When receiving the disconnection command, the process executes a specified disconnection process in the projector 301 (step S910) and issues a disconnection completion command to the server 20 (step S915). This disconnects the connection with the server 20 (step S920).

(6) Modifications

While there has been described the embodiment of the projector system 10 that uses the wireless LAN to connect the server 20 with the projectors 301 through 30n, the present invention is obviously not limited to the system in the wireless LAN network. It may be preferable to configure the projector system 10 comprising a wired LAN network or a combination of wireless and wired LAN networks. In this case, the system can be constructed by using network functions such as IEEE 1394 and the like for the wired LAN network. The embodiment has presented the mode of applying the image data transmission system according to the present invention to the projector system. It is obvious that the image data transmission system can be applied to a system comprising a plurality of computers. That is to say, the image data transmission system can also construct a system that displays image data for images in one computer on another computer.

(7) Summary

A connection is established between the server 20 and the projectors 301 through 30n as follow. First, a UDP communication command is used to retrieve the connectable projectors 301 through 30n and then to select the projector 301 to be connected. An IP address is assigned to the projector 301. A reliable TCP/IP communication command is used to establish a connection for inputting and outputting image data and the like. In this manner, a user can easily obtain a connection environment capable of intercommunication between the server 20 and the projector 301. Since the authentication can be provided using a keyword projected during the connection establishment, it is possible to prevent an unauthorized access to the projector 301 by an outsider.

We claim:

1. A projector comprising:
   a keyword generating unit which generates a keyword;
   an image projecting unit which visibly projects the keyword;
   a keyword determining unit which determines whether an input received from a computer matches the keyword; and
   a computer connection establishing unit which establishes connection to the computer when the keyword determining unit determines that the input received from the computer matches the keyword,
   wherein the image projecting unit projects an image based on image data inputted from the computer after the connection with the computer is established.

2. The projector according to claim 1, further comprising:
   a response output unit which outputs at least one of a name of the projector, intrinsic information about the projector, information about a status of use of the projector and information about a keyword authentication.

3. A method of establishing computer connection, comprising:
   generating a keyword by a projector;
   the projector visibly projecting the keyword;
   determining whether an input received by the projector from a computer matches the keyword;
   establishing a connection between the projector and the computer when the input received from the computer matches the keyword; and
   the projector projecting an image based on image data inputted from the computer after the connection with the computer is established.

4. The method according to claim 3, further comprising:
   displaying a list screen of connectable projectors; and
   selecting the specific projector to be connected from the list screen.

5. A non-transitory computer-readable storage medium storing a computer-executable program, the computer program comprising:
   instructions for generating a keyword by a projector;
   instructions for visibly projecting the keyword by the projector;
   instructions for determining whether an input received from a computer matches the keyword;
   instructions for establishing a connection between the projector and the computer when the input received from the computer matches the keyword; and
   instructions for projecting an image by the projector based on image data inputted from the computer after the connection with the computer is established.

6. The non-transitory computer-readable storage medium storing a computer-executable program according to claim 5, further comprising:
   instructions for displaying a list screen of connectable projectors; and
   instructions for selecting the specific projector to be connected from the list screen.

* * * * *